United States Patent
Yoshida

(10) Patent No.: US 9,594,989 B2
(45) Date of Patent: Mar. 14, 2017

(54) IMAGE-PROCESSING DEVICE DETERMINING DOT FORMATION STATE OF TARGET PIXEL BY USING GRADATION VALUE OF TARGET PIXEL

(71) Applicant: BROTHER KOGYO KABUSHIKI KAISHA, Nagoya-shi, Aichi-ken (JP)

(72) Inventor: Yasunari Yoshida, Aichi-ken (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/806,890

(22) Filed: Jul. 23, 2015

(65) Prior Publication Data
US 2016/0034797 A1 Feb. 4, 2016

(30) Foreign Application Priority Data
Jul. 30, 2014 (JP) .................................. 2014-155369

(51) Int. Cl.
G06K 15/02 (2006.01)
H04N 1/405 (2006.01)

(52) U.S. Cl.
CPC ..... *G06K 15/1878* (2013.01); *G06K 15/1872* (2013.01); *H04N 1/4052* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,975,679 A * | 11/1999 | Nicoloff, Jr. | ........... | B41J 2/1752 347/37 |
| 6,731,400 B1 * | 5/2004 | Nakamura | ............. | G06K 15/00 358/1.9 |
| 7,667,881 B2 * | 2/2010 | Yamada | ............... | H04N 1/6005 358/1.9 |
| 8,052,242 B2 * | 11/2011 | Uchiyama | ............... | B41J 2/2052 347/15 |
| 8,382,228 B2 * | 2/2013 | Uchiyama | ............... | B41J 2/2052 347/15 |
| 8,462,387 B2 * | 6/2013 | Fujita | ................... | H04N 1/1911 358/1.14 |
| 2011/0148966 A1 * | 6/2011 | Yoshida | ................. | B41J 2/2103 347/14 |

FOREIGN PATENT DOCUMENTS

| | | |
|---|---|---|
| JP | 10-51638 A | 2/1998 |
| JP | 2011-131428 A | 7/2011 |

* cited by examiner

*Primary Examiner* — Barbara Reinier
(74) *Attorney, Agent, or Firm* — Merchant & Gould P.C.

(57) ABSTRACT

In an image-processing device, the controller determines a dot formation state of a target pixel in an image. The determination is performed alternately with a forward process and a reverse process while sequentially selecting each of pixel lines in an order progressing in a first direction. A second pixel density of a second image of a second color is smaller than a first pixel density of a first image of a first color. In the determination, each of the line processes is one of at least two of a first type line process, a second type line process, a third type line process, and a fourth type line process. Line processes are performed for a first unit area in a first pattern. Line processes are performed for a second unit area in a second pattern different from the first pattern.

8 Claims, 10 Drawing Sheets

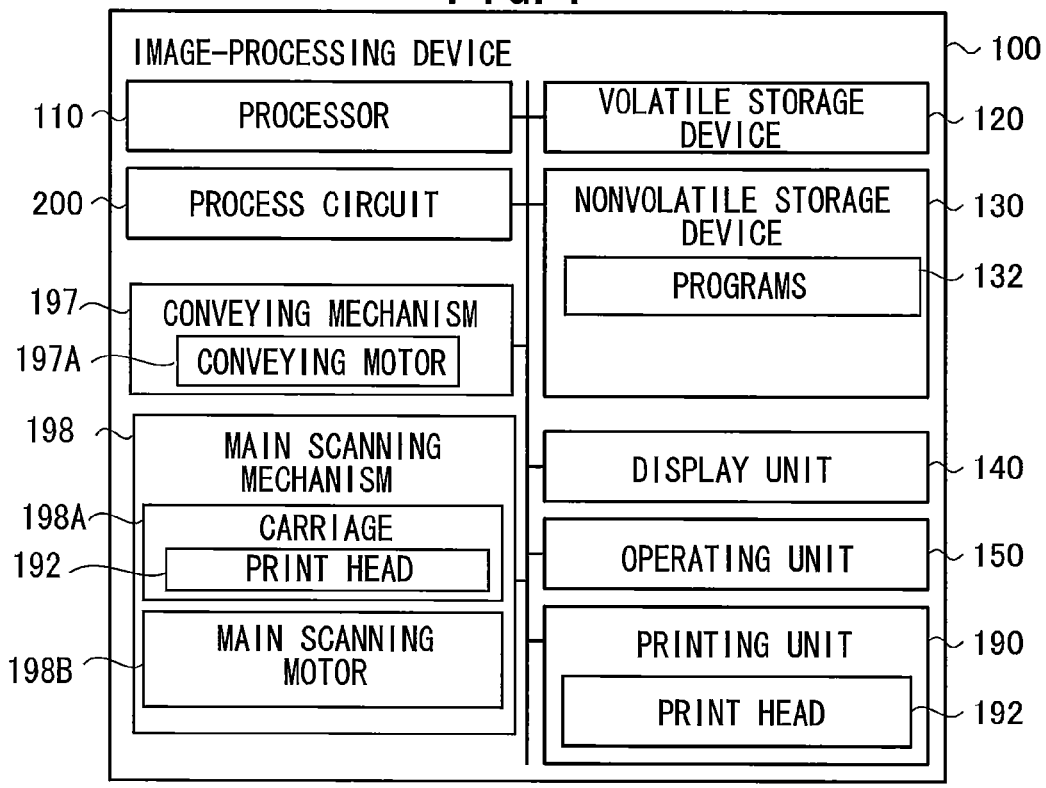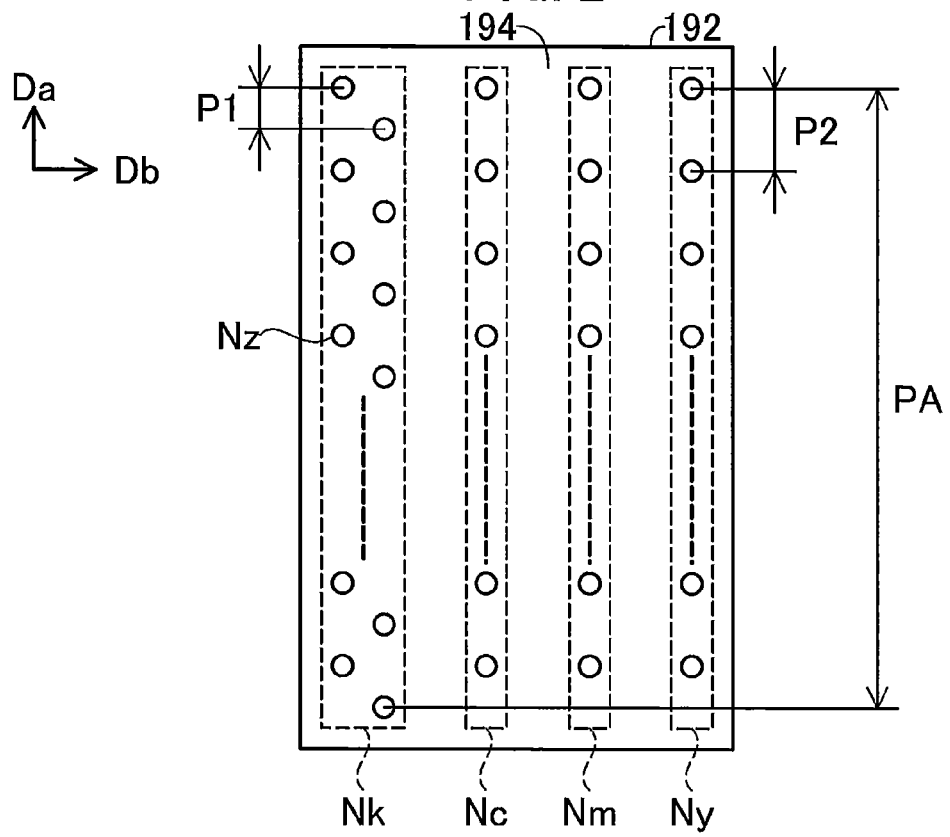

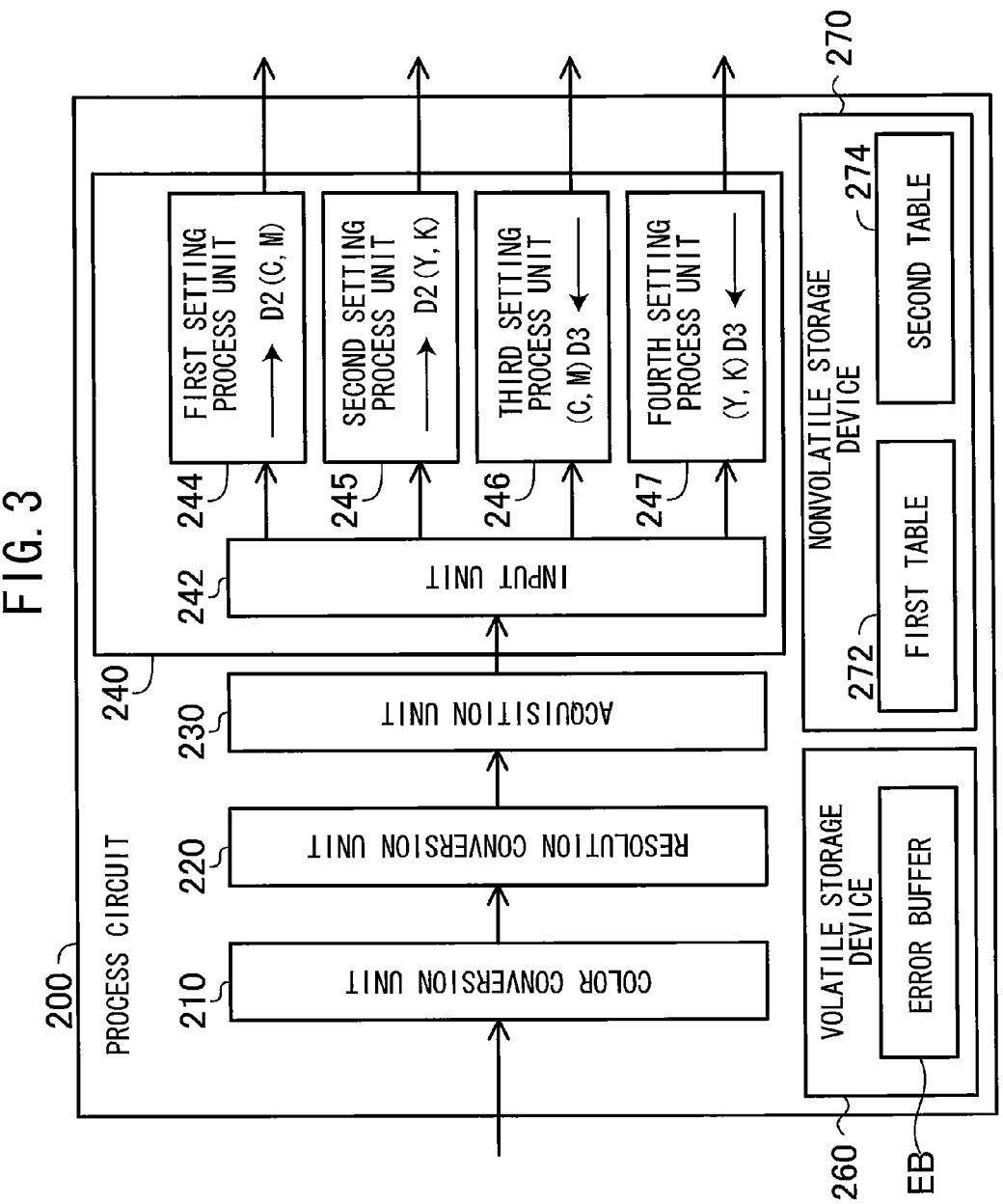

FIG. 5
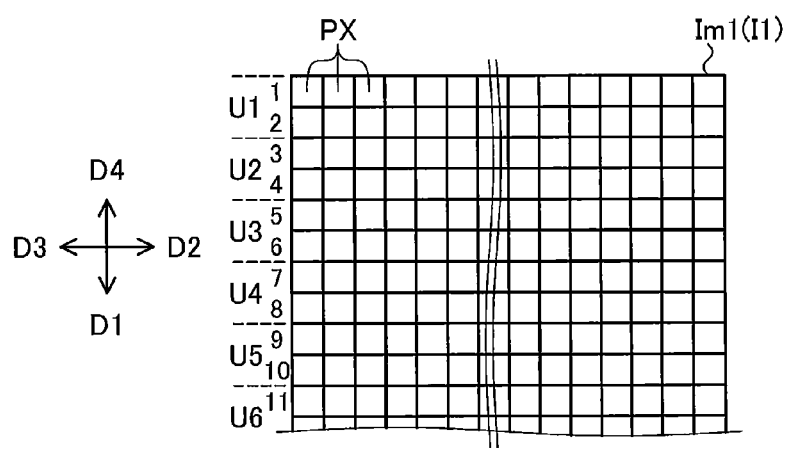
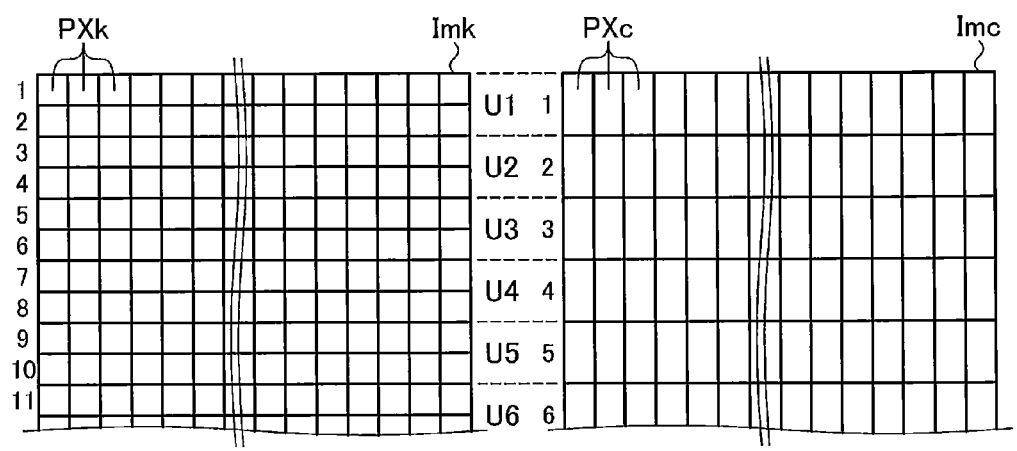

IMAGE-PROCESSING DEVICE DETERMINING DOT FORMATION STATE OF TARGET PIXEL BY USING GRADATION VALUE OF TARGET PIXEL

CROSS REFERENCE TO RELATED APPLICATION

This application claims priority from Japanese Patent Application No. 2014-155369 filed Jul. 30, 2014. The entire content of the priority application is incorporated herein by reference.

TECHNICAL FIELD

The present disclosure relates to a technique for setting the formation states of printed dots based on image data.

BACKGROUND

Printing operations have been performed by recording dots of color material (ink, for example) on a recording medium (paper, for example). Further, a technique, such as a halftone process using error diffusion process, has been proposed for processing multi-level image data comprising a plurality of color components (cyan (C), magenta (M), yellow (Y), and black (K), for example) by setting the dot formation state of each color component in a target pixel while sequentially shifting the position of the target pixel.

SUMMARY

Printing characteristics can be widely varied by varying the densities of dot positions (i.e., pixel densities) among the plurality of color components. For example, by setting the pixel density for K greater than the pixel densities for C, M, and Y, the definition of black text can be enhanced in color images. However, the process of setting dot formation states for a plurality of color components can become quite complex when using different pixel densities for different color components.

In view of the foregoing, it is an object of the present disclosure to provide a technique for suppressing complexity in a process for setting dot formation states.

In order to attain the above and other objects, the disclosure provides an image-processing device having a controller. The controller is configured to perform: acquiring target image data representing an image having a plurality of pixel lines arranged in a first direction, each of the plurality of pixel lines extending in a second direction orthogonal to the first direction and including a plurality of pixels; determining a dot formation state of a target pixel among the plurality of pixels and an error value of the target pixel by using a gradation value of the target pixel and an error value of at least one peripheral pixel of the target pixel; and supplying data representing the dot formation state to a printing unit. The target image data includes first image data representing a first image of a first color and having gradation values of the first color and second image data representing a second image of a second color and having gradation values of the second color. The first image data includes a first pixel density in the first direction. The second image data includes a second pixel density in the first direction. The second pixel density is smaller than the first pixel density. A ratio of the first pixel density to the second pixel density is L:N. L is an integer larger than 2. N is an integer larger than 1 and smaller than L. A greatest common divisor for L and N is 1. A determination by the determining is performed alternately with a forward process and a reverse process on pixel line to pixel line basis while sequentially selecting each of the plurality of pixel lines in an order progressing in the first direction, wherein in the forward process, the controller sequentially selects each pixel as the target pixel in one selected pixel line in an order progressing in the second direction, and determines the dot formation state of the selected pixel whereas, in the reverse process, the controller sequentially selects each pixel as the target pixel in one selected pixel line in an order progressing in a third direction opposite to the second direction, and determines the dot formation state of the selected pixel. The image includes a plurality of unit areas. The first image includes a plurality of first-type pixel lines extending in the second direction as a part of the plurality of pixel lines. The second image includes a plurality of second-type pixel lines extending in the second direction as another part of the plurality of pixel lines. Each of the plurality of unit areas including L-number of the first-type pixel lines arranged sequentially in the first direction and N-number of the second-type pixel lines arranged sequentially in the first direction. the plurality of unit areas includes a first unit area and a second unit area. Determination of dot formation states for pixels in the second unit area is performed next to determination of dot formation states for pixels in the first unit area. The determination performed by the controller includes line processes for L times to determine dot formation states of pixels in the L-number of the first-type pixel lines in one unit area and the N-number of the second-type pixel lines in the one unit area. Each of the line processes performed L times is one of at least two of a first type line process, a second type line process, a third type line process, and a fourth type line process. In the first type line process, dot formation states of pixels in the second-type pixel line are not determined, and dot formation states of pixels in the first-type pixel line are determined according to the forward process. In the second type line process, dot formation states of pixels in the second-type pixel line are not determined, and dot formation states of pixels in the first-type pixel line are determined according to the reverse process. In the third type line process, dot formation states of pixels in the first-type pixel line and dot formation states of pixels in the second-type pixel line are determined according to the forward process. In the fourth type line process, dot formation states of pixels in the first-type pixel line and dot formation state of pixels in the second-type pixel line are determined according to the reverse process. Line processes are performed L times for the first unit area in a first pattern defined by a combination and an order of the first type line process, the second type line process, the third type line process, and the fourth type line process. Line processes are performed L times for the second unit area in a second pattern defined by a combination and an order of the first type line process, the second type line process, the third type line process, and the fourth type line process. The first pattern differs from the second pattern.

According to another aspects, the disclosure provides a non-transitory computer readable storage medium storing a set of program instructions installed on and executed by a computer. The program instructions includes: acquiring target image data representing an image having a plurality of pixel lines arranged in a first direction, each of the plurality of pixel lines extending in a second direction orthogonal to the first direction and including a plurality of pixels; determining a dot formation state of a target pixel among the plurality of pixels and an error value of the target pixel by using a gradation value of the target pixel and an error value of at least one peripheral pixel of the target pixel; and supplying data representing the dot formation state to a printing unit. The target image data includes first image data representing a first image of a first color and having gradation values of the first color and second image data representing a second image of a second color and having gradation values of the second color. The first image data includes a first pixel density in the first direction. The second image data includes a second pixel density in the first direction. The second pixel density is smaller than the first pixel density. A ratio of the first pixel density to the second pixel density is L:N. L is an integer larger than 2. N is an integer larger than 1 and smaller than L. A greatest common divisor for L and N is 1. A determination by the determining is performed alternately with a forward process and a reverse process on pixel line to pixel line basis while sequentially selecting each of the plurality of pixel lines in an order progressing in the first direction, wherein in the forward process, the controller sequentially selects each pixel as the target pixel in one selected pixel line in an order progressing in the second direction, and determines the dot formation state of the selected pixel whereas, in the reverse process, the controller sequentially selects each pixel as the target pixel in one selected pixel line in an order progressing in a third direction opposite to the second direction, and determines the dot formation state of the selected pixel. The image includes a plurality of unit areas. The first image includes a plurality of first-type pixel lines extending in the second direction as a part of the plurality of pixel lines. The second image includes a plurality of second-type pixel lines extending in the second direction as another part of the plurality of pixel lines. Each of the plurality of unit areas including L-number of the first-type pixel lines arranged sequentially in the first direction and N-number of the second-type pixel lines arranged sequentially in the first direction. the plurality of unit areas includes a first unit area and a second unit area. Determination of dot formation states for pixels in the second unit area is performed next to determination of dot formation states for pixels in the first unit area. The determination performed by the controller includes line processes for L times to determine dot formation states of pixels in the L-number of the first-type pixel lines in one unit area and the N-number of the second-type pixel lines in the one unit area. Each of the line processes performed L times is one of at least two of a first type line process, a second type line process, a third type line process, and a fourth type line process. In the first type line process, dot formation states of pixels in the second-type pixel line are not determined, and dot formation states of pixels in the first-type pixel line are determined according to the forward process. In the second type line process, dot formation states of pixels in the second-type pixel line are not determined, and dot formation states of pixels in the first-type pixel line are determined according to the reverse process. In the third type line process, dot formation states of pixels in the first-type pixel line and dot formation states of pixels in the second-type pixel line are determined according to the forward process. In the fourth type line process, dot formation states of pixels in the first-type pixel line and dot formation state of pixels in the second-type pixel line are determined according to the reverse process. Line processes are performed L times for the first unit area in a first pattern defined by a combination and an order of the first type line process, the second type line process, the third type line process, and the fourth type line process. Line processes are performed L times for the second unit area in a second pattern defined by a combination and an order of the first type line process, the second type line process, the third type line process, and the fourth type line process. The first pattern differs from the second pattern.

BRIEF DESCRIPTION OF THE DRAWINGS

The particular features and advantages of the disclosure as well as other objects will become apparent from the following description taken in connection with the accompanying drawings, in which:

FIG. 1 is a block diagram showing an image-processing device according to a first embodiment;

FIG. 2 is a schematic diagram of a nozzle surface;

FIG. 3 is a block diagram showing a general structure of a process circuit;

FIG. 5 is an explanatory diagram of bitmap images;

DETAILED DESCRIPTION

A. First Embodiment

Figure 4:
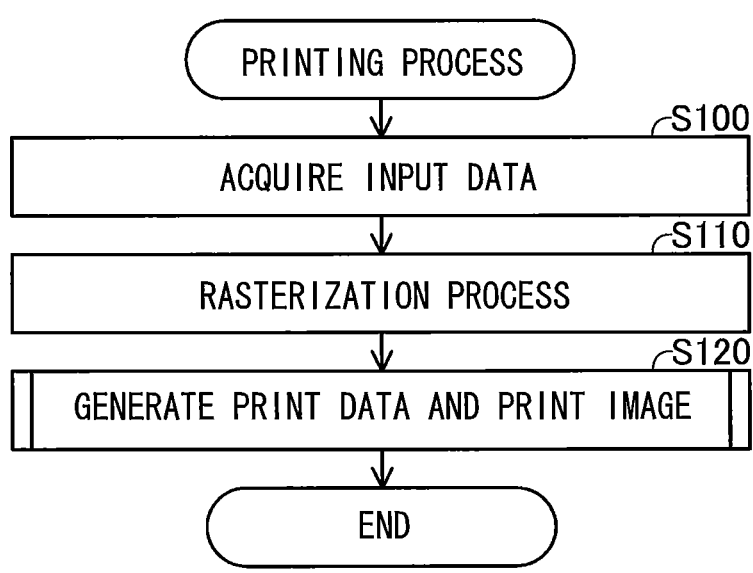
FIG. 4 is a flowchart illustrating a printing process according to the first embodiment.

FIG. 1 is a block diagram showing an image-processing device 100 according to the first embodiment. The image-processing device 100 may be a multifunction peripheral, for example. The image-processing device 100 of the first embodiment includes a processor 110, a volatile storage device 120, a nonvolatile storage device 130, a display unit 140, an operating unit 150, a printing unit 190, and a process circuit 200.

The processor 110 is a central processing unit (CPU), for example, and serves to process data. The volatile storage device 120 is DRAM, for example. The nonvolatile storage device 130 is a flash memory, for example. The nonvolatile storage device 130 stores programs 132. By executing the programs 132, the processor 110 implements various functions described later in greater detail. The processor 110 also temporarily stores various intermediate data used when the programs 132 or the like in the volatile storage device 120, the nonvolatile storage device 130, for example.

The display unit 140 is a liquid crystal display, for example, and functions to display images. The operating unit 150 is a touchscreen placed over the display unit 140, for example, and functions to receive input operations performed by the user. By operating the operating unit 150, the user can input various commands, including a start command for initiating a printing process described later, into the image-processing device 100.

The printing unit 190 functions to print images on a printing medium (paper, for example). In the embodiment, the printing unit 190 is an inkjet printing device that employs ink in the colors cyan (C), magenta (M), yellow (Y), and black (K). The printing unit 190 has a print head 192 that ejects ink droplets in each ink color onto the paper. The printing unit 190 further has a conveying mechanism 197, and a main scanning mechanism 198. The conveying mechanism 197 includes a conveying motor 197A that produces a drive force for conveying sheets of paper. The main scanning mechanism 198 includes a carriage 198A for supporting the print head 192, and a main scanning motor 198B that produces a drive force for reciprocating the carriage 198A (and hence the print head 192) in a main scanning direction. This operation for reciprocating the carriage will be referred to as a "main scan."

The print head 192 has a nozzle surface 194. FIG. 2 is a schematic diagram of the nozzle surface 194. In the embodiment, a plurality of nozzles Nz is provided in the nozzle surface 194. The print head 192 ejects ink droplets out of the nozzles Nz toward a sheet of paper in order to form dots on the paper. The nozzles Nz are divided into a black nozzle group Nk for ejecting black ink droplets, a cyan nozzle group Nc for ejecting cyan ink droplets, a magenta nozzle group Nm for ejecting magenta ink droplets, and a yellow nozzle group Ny for ejecting yellow ink droplets.

FIG. 2 indicates a conveying direction Da and a main scanning direction Db. The conveying direction Da denotes the direction in which paper is conveyed relative to the print head 192. The main scanning direction Db denotes one direction among the reciprocating directions in a main scan. In the embodiment, the main scanning direction Db is perpendicular to the conveying direction Da.

The nozzles Nz in the black nozzle group Nk are arranged in the conveying direction Da at a first pitch P1. The nozzles Nz in each of the chromatic ink (cyan, magenta, and yellow in this example) nozzle groups Nc, Nm, and Ny are arranged in the conveying direction Da at a second pitch P2. In the embodiment, the first pitch P1 is smaller than the second pitch P2, and specifically is half the second pitch P2.

The nozzles Nz in each of the three chromatic ink nozzle groups Nc, Nm, and Ny are arranged at the same positions in the conveying direction Da. The nozzles Nz in each of the nozzle groups Nc, Nm, and Ny are arranged at the second pitch P2 over a specific range PA in the conveying direction Da. Thus, during one main scan the nozzle groups Nc, Nm, and Ny can print an image within the specific range PA at a second dot density (in the conveying direction Da) corresponding to the second pitch P2.

Nozzles Nz in the black nozzle group Nk are arranged at the first pitch P1 within the specific range PA. In the embodiment, half of the nozzles Nz in the black nozzle group Nk are arranged at the same positions relative to the conveying direction Da as the nozzles Nz in the chromatic ink nozzle groups Nc, Nm, and Ny. Each of the other half of the nozzles Nz in the black nozzle group Nk in the conveying direction Da is arranged between adjacent two nozzles of the first half of the nozzles Nz. Through one main scan, the black nozzle group Nk can print an image within the specific range PA at a first dot density (in the conveying direction Da) corresponding to the first pitch P1. The first dot density is twice the second dot density in the embodiment. The first dot density may be 600 dots per inch (dpi), for example. Note that the nozzles Nz in the chromatic ink nozzle groups Nc, Nm, and Ny may also be arranged at differing positions of the nozzles Nz in the black nozzle group Nk in the conveying direction Da.

The process circuit 200 (see FIG. 1) executes an image process described later. In the embodiment, the process circuit 200 is an application-specific integrated circuit (ASIC). FIG. 3 is a block diagram showing the general structure of the process circuit 200. The process circuit 200 includes a color conversion unit 210, a resolution conversion unit 220, an acquisition unit 230, a setting unit 240, a volatile storage device 260, and a nonvolatile storage device 270. The setting unit 240 further includes an input unit 242, and four setting process units 244, 245, 246, and 247. The volatile storage device 260 is provided with an error buffer EB described later. The nonvolatile storage device 270 stores a look-up table 272 (hereinafter called the "first table 272"), and a dot gradation value table 274 (hereinafter called the "second table 274"). The process circuit 200 will be described later in greater detail.

FIG. 4 is a flowchart showing steps in a printing process. The processor 110 initiates the printing process when a user inputs a start command through the operating unit 150 (see FIG. 1) to start the printing process. The processor 110 controls the printing process on the basis of the programs 132.

In S100 of FIG. 4, the processor 110 (see FIG. 1) acquires input data as the print target. In the embodiment, the input data is specified in the start command. For example, the user may specify, as the input data, image data stored on another device with which the image-processing device 100 can communicate via a device interface (not shown). The device interface is any interface functioning to communicate with other devices, such as a USB interface, a wired LAN interface, or the IEEE 802.11 wireless interface. Any device may be used for storing input data, including a standalone storage device such as flash memory, a portable terminal such as a smartphone, and a server. The input data may be data described in a page description language (PDL), such as the PDF format, or may be bitmap data saved in the JPEG format, for example.

In S110 the processor 110 executes a rasterization process on the input data to generate bitmap data I1 at a resolution suited to a printing process. The printing process resolution in the embodiment is equivalent to the resolution associated with the first pitch P1 (i.e., the pixel density). The bitmap data I1 generated in S110 expresses the color of each pixel in the image as the gradation values (one of 256 levels, for example) for the three color components red (R), green (G), and blue (B). However, the colors of pixels in the bitmap data I1 may be expressed in a different color space, such as the YCbCr color space. The processor 110 stores the bitmap data I1 generated in S110 in a storage unit of the image-processing device 100, such as the volatile storage device 120.

FIG. 5 is an explanatory diagram of a bitmap image Im1 rendered by the bitmap data I1. As shown in FIG. 5, the bitmap image Im1 has a plurality of pixels PX that are arranged in a matrix extending in both a first direction D1 and a second direction D2. The second direction D2 is perpendicular to the first direction D1. The direction opposite to the second direction D2 in FIG. 5 is a third direction D3, while the direction opposite the first direction D1 is a fourth direction D4. When the printing unit 190 prints the bitmap image Im1, the first direction D1 along the printed image is the direction opposite the conveying direction Da in FIG. 2, while the second direction D2 is the same as the main scanning direction Db.

As described above, the pixel density in the bitmap image Im1 in the first direction D1 is the same as the pixel density associated with the first pitch P1 (see FIG. 2). The pixel density of the bitmap image Im1 in the second direction D2 is the same as the pixel density in the first direction D1. However, the pixel density in the second direction D2 may be configured to be different from the pixel density in the first direction D1.

Figure 6:
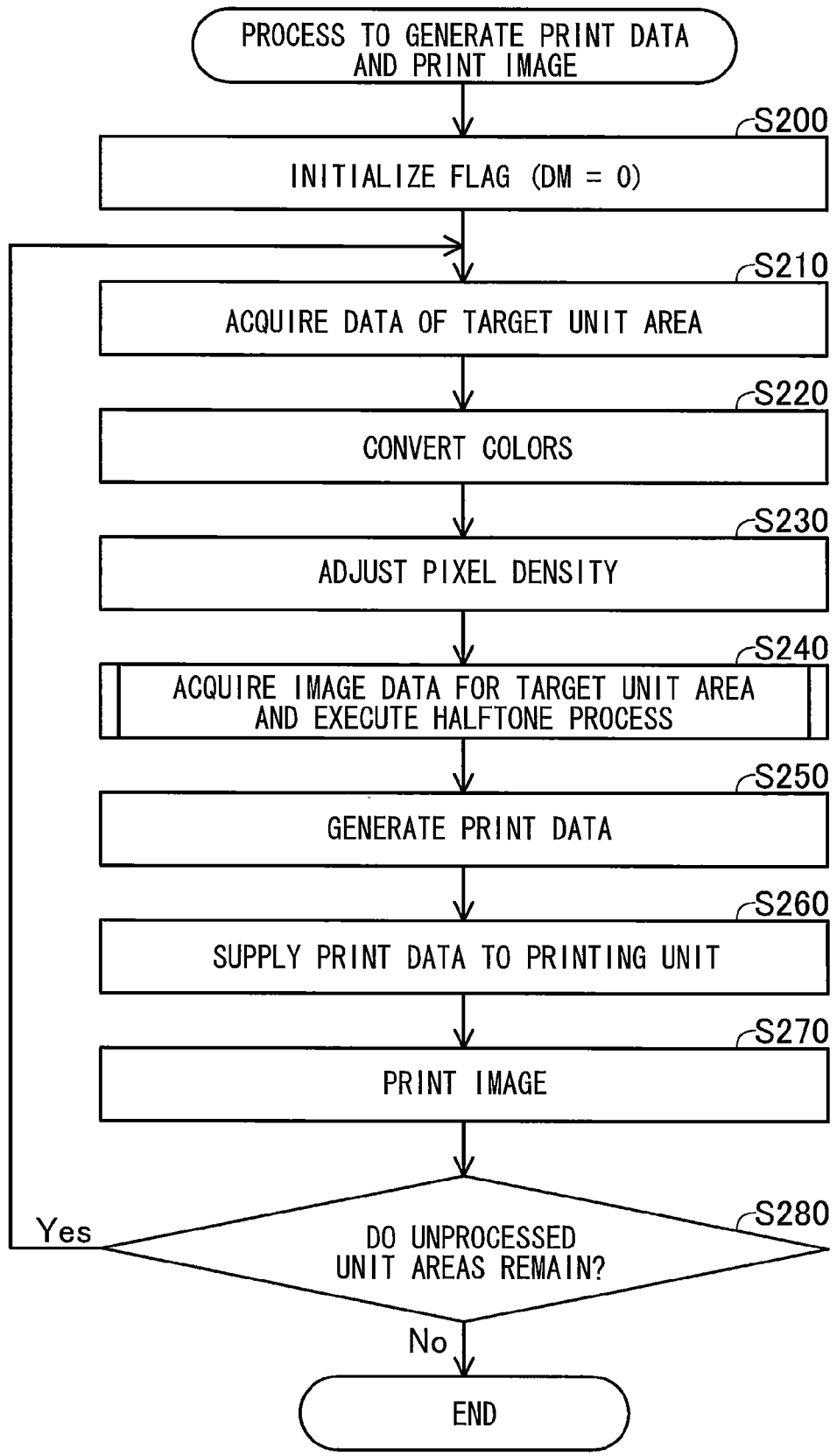
FIG. 6 is a flowchart illustrating a halftone process according to the first embodiment.

In S120 of FIG. 4, the processor 110 executes a process to generate print data from the bitmap data I1, and a process to print an image based on the generated print data. FIG. 6 is a flowchart illustrating steps in the process for generating print data and the process for printing the image based on the print data. In S120 the processor 110 issues a command to the process circuit 200 (see FIG. 3) to start the process in FIG. 6, and the process circuit 200 begins the process in FIG. 6 in response to this command.

The process circuit 200 is provided with the volatile storage device 260, as well as registers (not shown), for storing data being exchanged with external devices, such as the processor 110. The processor 110 can supply data (a command, for example) to the process circuit 200 by storing the data in at least one of the volatile storage device 260 and the registers of the process circuit 200. The processor 110 can also acquire data from the process circuit 200 by reading data from at least one of the volatile storage device 260 and the registers provided in the process circuit 200.

In S200 of FIG. 6, the input unit 242 (see FIG. 3) of the process circuit 200 initializes a flag DM to zero (DM=0). The flag DM will be described later. Data representing the flag DM is stored in the volatile storage device 260 or the registers of the process circuit 200.

The process from S210 to S280 is performed for each unit area of the bitmap image Im1. A unit area is a partial region of the bitmap image Im1 and is specified by the letter "U", followed by a numerical value, as indicated on the left side of the bitmap image Im1 in FIG. 5. In addition, sequential numbers provided along the left side of the bitmap image Im1 indicate the line number for pixel lines (hereinafter, the sequential numbers will be called "line numbers"). A pixel line is a line of pixels arranged in the second direction D2. Line numbers are assigned in sequence from lowest to highest in the first direction D1, beginning from line number 1. In the embodiment, a unit area is an area represented by two consecutive pixel lines in the first direction D1. The bitmap image Im1 is divided into a plurality of unit areas arranged one after another in the first direction D1. The numerical value included in the symbol for the unit area (U1, U2, . . . , or U6) indicates the number of the unit area. Numbers are assigned to unit areas in sequence from lowest to highest in the first direction D1, beginning from the first unit area U1. Hence, the first unit area U1 includes pixel lines 1 and 2, while the second unit area U2 includes pixel lines 3 and 4. The process in FIG. 6 from S210 to S280 is repeated on each unit area of the bitmap image Im1 until the entire bitmap image Im1 has been processed.

In S210 the color conversion unit 210 (see FIG. 3) of the process circuit 200 selects one unprocessed unit area as the target unit area. Unit areas are selected to be the target unit area in order of the first direction D1 beginning from the first unit area U1. Next, the color conversion unit 210 acquires data for the two pixel lines included in the target unit area from the storage device of the image-processing device 100 (the volatile storage device 120, for example). Thus, the first time that the color conversion unit 210 executes S210, the color conversion unit 210 acquires data for the two pixel lines in the first unit area U1 (pixel lines 1 and 2). The second time that the color conversion unit 210 executes S210, the color conversion unit 210 acquires data for the two pixel lines in the second unit area U2 (pixel lines 3 and 4).

In S220 the color conversion unit 210 converts the gradation values for all pixels in the two acquired pixel lines from RGB gradation values to CMYK gradation values corresponding to the color components of ink used for printing. The correlations between the RGB values and CMYK values are predefined in the first table 272, which is pre-stored in the nonvolatile storage device 270 of the process circuit 200. The color conversion unit 210 executes color conversion while referring to the first table 272. The color conversion unit 210 supplies data representing the converted gradation values for all pixels in the two pixel lines to the resolution conversion unit 220.

In S230 the resolution conversion unit 220 (see FIG. 3) adjusts the pixel density in the first direction D1 for each color component in the converted image data to a density suitable for printing. FIG. 5 shows two examples of adjusted images Imk and Imc rendered by the adjusted data produced in S230 when the resolution conversion unit 220 adjusts the pixel densities. The adjusted image Imk on the left side in FIG. 5 represents a black image, while the adjusted image Imc on the right side represents a cyan image. Dashed lines provided between the adjusted images Imk and Imc indicate the borders of unit areas. As described with reference to FIG. 2, the density of CMY dots in the conveying direction Da in the embodiment is half the density of K dots. Accordingly, the resolution conversion unit 220 does not change the pixel density of K in the first direction D1, but sets the pixel density for CMY dots in the first direction D1 to half. Hereinafter, the pixel density for K in the first direction D1 will be called the "first pixel density," and the pixel density for CMY in the first direction D1 will be called the "second pixel density." In the embodiment, the first pixel density is twice the second pixel density.

Pixels PXk in the adjusted black image Imk have the same gradation values as the black component in pixels PX at corresponding positions of the original bitmap image Im1. Line numbers are also provided along the left side of the adjusted black image Imk to indicate the pixel lines therein. The line numbers for the adjusted black image Imk are identical to those for the bitmap image Im1 for pixel lines at the same position.

The area occupied by a single pixel PXc in the adjusted cyan image Imc includes (or corresponds to) two pixels PX of the bitmap image Im1 aligned in the first direction D1. The resolution conversion unit 220 sets the gradation value for cyan in the new pixel PXc based on the gradation values for cyan in these two pixels PX. Any of various methods for deriving a single gradation value from at least one of the gradation values for the original two pixels PX may be employed as the method of setting the gradation value for the new pixel PXc. For example, the resolution conversion unit 220 may simply set the gradation value of the new pixel PXc to the gradation value of one prescribed pixel PX among the two pixels PX (the pixel PX on the downstream side in the first direction D1, for example). Alternatively, the resolution conversion unit 220 may set the gradation value of the new pixel PXc to the average of the gradation values for the two pixels PX. Note that numbers for pixel lines are indicated on the left side of the adjusted cyan image Imc in FIG. 5. These pixel line numbers are assigned in order from lowest to highest in the first direction D1 beginning from line number 1.

While not illustrated in the drawings, the resolution conversion unit 220 also adjusts the pixel densities for magenta and yellow according to the same method used for adjusting the pixel densities for cyan. Hereinafter, the magenta image that has undergone adjustments to its pixel density will be called the "adjusted magenta image." Similarly, the yellow image that has undergone adjustments to its pixel density will be called the "adjusted yellow image."

Symbols U1-U6 designating the unit areas are included between the adjusted black image Imk and the adjusted cyan image Imc in FIG. 5. Here, the first unit area U1 includes pixel lines 1 and 2 from the adjusted black image Imk, and pixel line 1 from each of the adjusted cyan image Imc, adjusted magenta image, and adjusted yellow image (where the adjusted magenta image and adjusted yellow image have been omitted from the drawing). Similarly, the second unit area U2 includes pixel lines 3 and 4 from the adjusted black image Imk, and pixel line 2 from each of the adjusted cyan image Imc, the adjusted magenta image, and the adjusted yellow image. Thus, one unit area in the embodiment is configured of two black pixel lines and one each of the cyan, magenta, and yellow pixels.

In S240 of FIG. 6, the acquisition unit 230 (see FIG. 3) acquires image data for the target unit area whose resolution has been adjusted from the resolution conversion unit 220. Hereinafter, image data whose resolution (i.e., pixel density) has been adjusted will be called the "target data." The acquisition unit 230 supplies the acquired target data to the setting unit 240 (see FIG. 3). The setting unit 240 executes a halftone process on the target data received from the acquisition unit 230. As will be described later, the setting unit 240 executes this halftone process for each color component of each pixel, one pixel at a time in order. Therefore, the acquisition unit 230 supplies data for pixels in the target data subjected to the halftone process to the setting unit 240 one pixel at a time in the same order as the order that pixels are processed in the halftone process. Note that all of steps S220, S230, and S240 may be executed for one pixel at a time.

Figure 7:
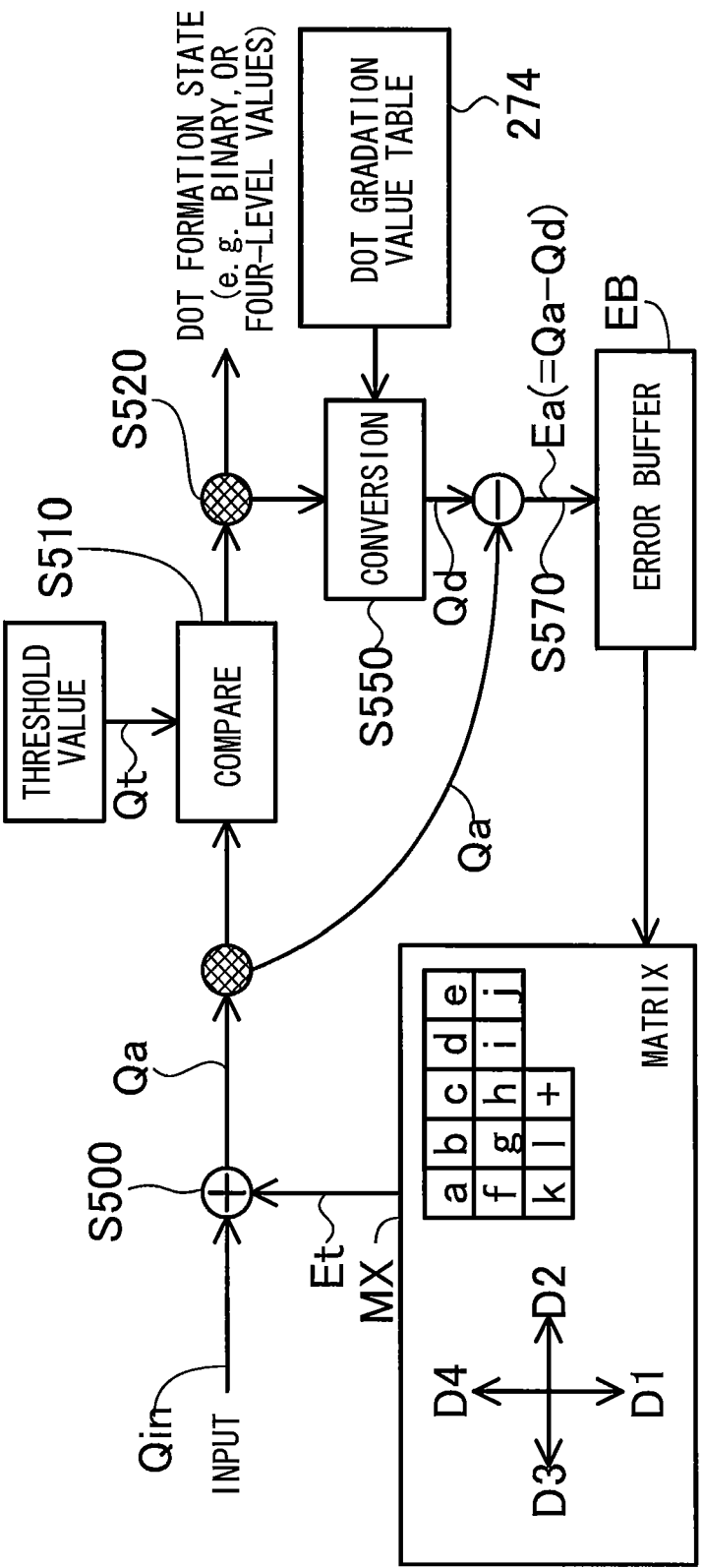
FIG. 7 is an overview of the halftone process according to the first embodiment.

FIG. 7 is an overview of the halftone process according to the embodiment. The halftone process is performed to set a dot formation state for each pixel position. In the embodiment, the dot formation state can be set to one of two states: "no dot" and "dot." However, the dot formation state may be set to one of three or more states, as well. For example, the four states "no dot," "small dot," "medium dot," and "large dot" may be provided as possible dot formation states. The halftone process is executed for each color component corresponding to the colors of printing ink. In the embodiment, a dot formation state is set for each pixel in the resolution-adjusted image.

The halftone process shown in FIG. 7 is performed on a single color component. The process is implemented using an error diffusion method. In S500 of FIG. 7, the setting unit 240 selects one pixel from the target unit area to be processed (hereinafter called the "target pixel"). When the target unit area includes a plurality of pixel lines, the setting unit 240 selects one of the pixel lines from which a target pixel is to be selected (hereinafter called the "target pixel line"), and subsequently selects the target pixel from the plurality of pixels constituting the target pixel line. Target pixel lines are selected in order, one by one, beginning from the pixel line on the downstream edge of the target unit area in the fourth direction D4 and progressing in the first direction D1. For example, when processing the third unit area U3 of the adjusted black image Imk in FIG. 5, the setting unit 240 selects target pixel lines in order from a target pixel line 5 and a target pixel line 6. As will be described later, in some cases target pixels will be selected from a single target pixel line one by one in order progressing in the second direction D2, and in other cases will be selected one by one in order progressing in the third direction D3.

The setting unit 240 calculates an error value Et to be passed on to the target pixel using an error matrix MX, and the error buffer EB. The error matrix MX is a predetermined matrix. The error buffer EB is a part of the storage region in the volatile storage device 260 (see FIG. 3). As will be described later, the error buffer EB stores an error value produced from the gradation value for each pixel. The error matrix MX assigns weights larger than 0 to pixels at prescribed relative positions around the target pixel (a Jarvis, Judice, and Ninke matrix, for example). In the error matrix MX of FIG. 7, a "+" symbol represents the target pixel, and letters "a", "b", . . . , "l" are weights that have been assigned to peripheral pixels. The sum of the weights "a", "b", . . . , "l" is 1. The error matrix MX in FIG. 7 is used when target pixels are selected in order, one at a time, progressing in the second direction D2. While not shown in the drawings, a matrix that is a mirror-reversed image of the error matrix MX in FIG. 7 (i.e., a matrix obtained by rotating the error matrix MX 180 degrees about an axis parallel to the first direction D1) is used when target pixels are selected in order, one at a time, progressing in the third direction D3.

The setting unit 240 calculates the weighted sum of error values in peripheral pixels of the target pixel according to their assigned weights as the error value Et to be diffused to the target pixel. Next, the setting unit 240 calculates the sum of the error value Et and the gradation value for the target pixel (hereinafter called the "input gradation value Qin") as the target gradation value Qa.

In S510 the setting unit 240 compares the target gradation value Qa to a threshold value Qt. In S520 the setting unit 240 sets the dot formation state for the target pixel on the basis of the comparison results. In the embodiment, the input gradation value Qin is expressed as one of 256 levels from 0 to 255. The threshold value Qt is a value between the minimum and maximum values input gradation values Qin (128, for example). The setting unit 240 sets the dot formation state to "dot" when the target gradation value Qa is greater than the threshold value Qt, and sets the dot formation state to "no dot" when the target gradation value Qa is less than or equal to the threshold value Qt.

In S550 the setting unit 240 identifies the gradation value associated with the dot formation state set in S520 (hereinafter called the dot gradation value Qd). The dot gradation value Qd indicates the gradation value represented by the dot formation state. For example, the dot gradation value Qd for "dot" may be set to 255, while the dot gradation value Qd for "no dot" may be set to 0. Correlations between dot formation states and the dot gradation values Qd in the embodiment are preset according to the second table 274 stored in the nonvolatile storage device 270. The setting unit 240 identifies the dot gradation value Qd by referencing the second table 274. However, the dot gradation value Qd may be dynamically modified, as well.

In S570 the setting unit 240 calculates an error value Ea produced by the target pixel (hereinafter called the "target error value Ea"). The target error value Ea can be expressed by the following equation.

"target error value $Ea$"="target gradation value $Qa$"–"dot gradation value $Qd$"

The setting unit 240 records the target error value Ea calculated in S570 in the error buffer EB as the error value produced at the target pixel. The target error value Ea recorded in this way is used subsequently in S500 as the error value of a peripheral pixel corresponding to a different target pixel.

The setting unit 240 sets the dot formation state of each pixel according to the method described above for each of the ink color components. Hereinafter, the process of setting dot formation states will simply be called the "setting process."

Figure 8:
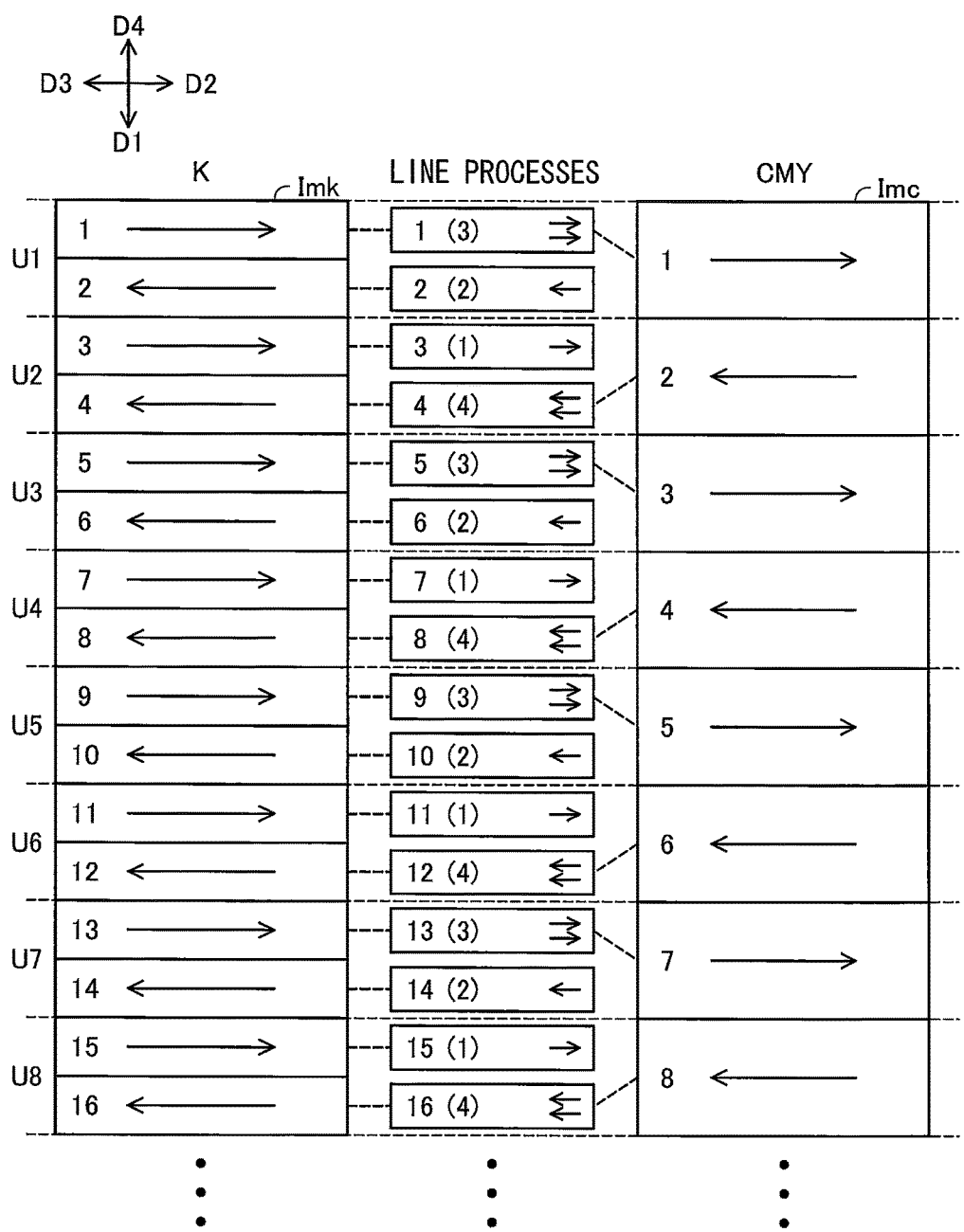
FIG. 8 is an explanatory diagram showing relationships between pixel lines for adjusted images and pixel processing directions for a setting process according to the first embodiment.

FIG. 8 is an explanatory diagram showing the relationships between pixel lines for the adjusted images Imk and Imc and pixel processing directions for the setting process. The adjusted black image Imk and the adjusted cyan image Imc are shown in FIG. 8. Within each of the adjusted images Imk and Imc, there is a plurality of rectangular boxes that denote pixel lines. The number included in each box indicates the line number. Dashed lines connecting the adjusted images Imk and Imc define the borders of unit areas. Symbols for these unit areas are provided along the left side of the adjusted black image Imk.

Arrows included for each pixel line indicate the direction in which pixels are processed in the setting process. For example, pixels in pixel line 1 of the adjusted black image Imk are processed in the second direction D2, while pixels in pixel line 2 are processed in the third direction D3. For the adjusted cyan image Imc, pixels in pixel line 1 are processed in the second direction D2, while pixels in pixel line 2 are processed in the third direction D3.

In general, a process for which the setting process is advanced in the second direction D2 (hereinafter called a "forward process") and a process for which the setting process is advanced in the opposite third direction D3 (hereinafter called a "reverse process") are executed alternately for pixel lines in the first direction D1 for both the adjusted images Imk and Imc. This is done to prevent the direction in which error values for gradation values are diffused, as described in FIG. 7, from being biased in one direction. If the direction for distributing error values is limited to one direction, dots may be formed in a non-uniform arrangement (an artifact called "worms"). By alternating between the forward process and the reverse process while progressing from line to line in the first direction D1, as illustrated in FIG. 8, the formation of worm artifacts in the image can be suppressed. While not shown in the drawing, the forward process and the reverse process are executed alternately while progressing from line to line in the first direction D1 for the adjusted magenta image and the adjusted yellow image similar to the adjusted cyan image Imc. The method of controlling the processing direction for the setting process (i.e., steps in S240 of FIG. 6) will be described later in greater detail.

In S240 of FIG. 6, the setting unit 240 supplies the results of the setting process, i.e., data representing the dot formation states for all pixels in the target unit area (hereinafter called "dot data") to the processor 110. The setting unit 240 stores this dot data in a storage device of the process circuit 200, such as the volatile storage device 260. The processor 110 is then able to acquire dot data from the volatile storage device 260. Alternatively, the setting unit 240 may be configured to store the dot data in a storage device of the image-processing device 100, such as the volatile storage device 120. In this case, the processor 110 is able to acquire dot data from the volatile storage device 120.

In S250 of FIG. 6, the processor 110 generates print data based on the dot data acquired from the process circuit 200. The print data represents the dot formation states in the target unit area in a format that the printing unit 190 can interpret. In S260 the processor 110 supplies this print data to the printing unit 190. In S270 the printing unit 190 prints an image according to the print data received from the processor 110. Here, the printing unit 190 may be configured to print all of the plurality of unit areas together based on print data received for the plurality of unit areas. In S280 the processor 110 determines whether any unprocessed unit areas remain and returns to S210 when there remain unprocessed unit areas (S280: YES). The processor 110 repeats the process from S210 to S280 until all unit areas have been processed. Once the process has been completed for all unit areas (S280: NO), printing of the image is completed and the processor 110 ends the process in FIG. 6, thereby completing the printing process of FIG. 4.

Figure 9:
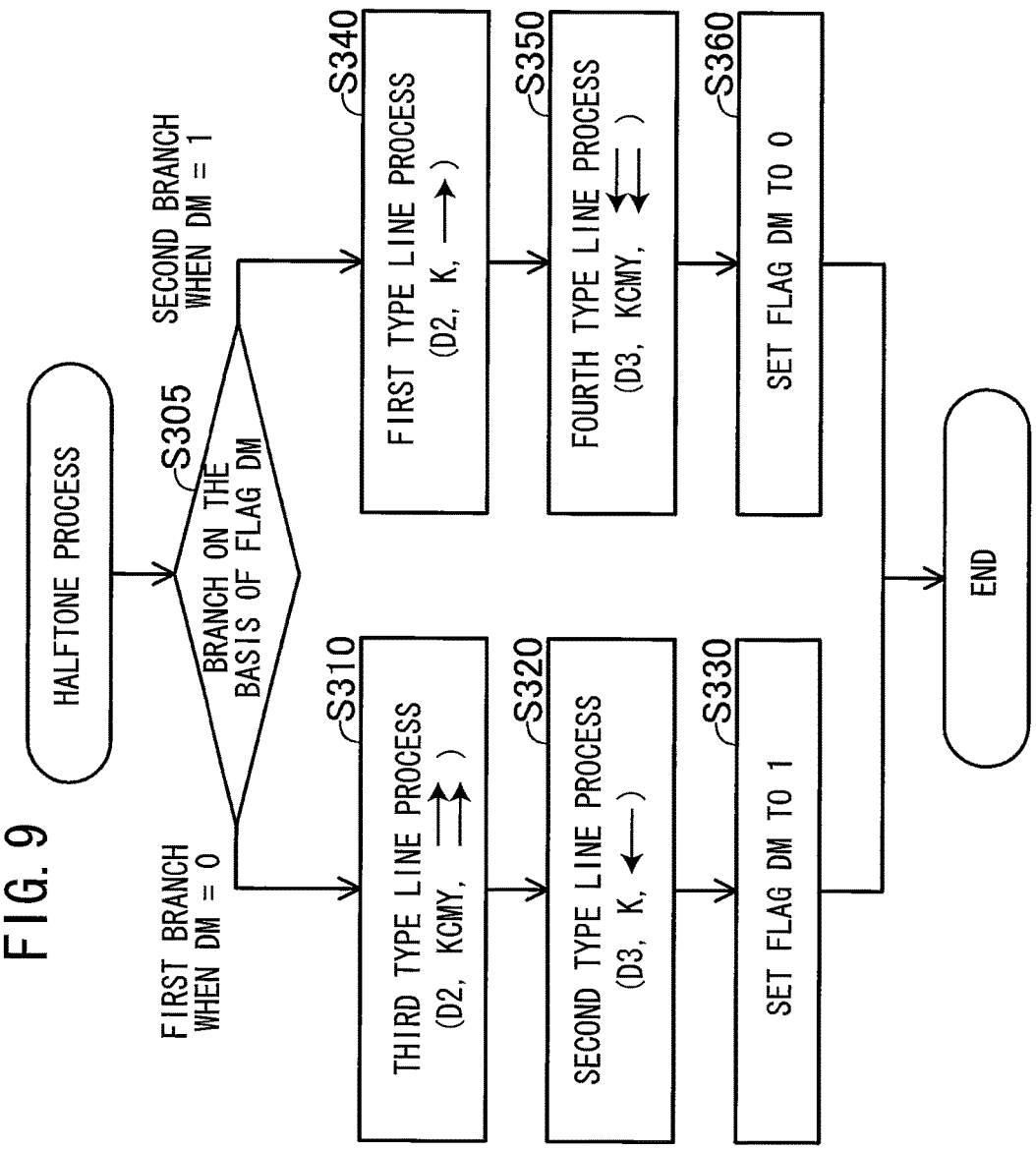
FIG. 9 is a flowchart illustrating the halftone process of the first embodiment.

FIG. 9 is a flowchart illustrating steps in the halftone process of the embodiment. In S305 of FIG. 9, the input unit 242 of the setting unit 240 branches in one of two directions based on the flag DM. As will be described later, the flag DM is "0" when the target unit area is an odd-numbered unit area, and "1" when the target unit area is an even-numbered unit area. The input unit 242 advances to a first branch when DM=0, and advances to a second branch when DM=1.

When advancing to the first branch, the input unit 242 first performs the processes in S310 and S320 described later. Next, in S330 the input unit 242 sets the flag DM to "1" and ends the process in FIG. 9. When advancing to the second branch, the input unit 242 first performs the processes in S340 and S350 described later. Next, in S360 the input unit 242 sets the flag DM to "0" and ends the process in FIG. 9. In this way, the flag DM is switched between 0 and 1 each time the process of FIG. 9 is executed. As a result, the flag DM will be "0" when the target unit area is an odd-numbered unit area and "1" when the target unit area is an even-numbered unit area.

Each of the processes in S310, S320, S340, and S350 is a process to advance the setting process for setting dot formation states in a specific direction (hereinafter called a "line process"). The four types of line processes in S310, S320, S340, and S350 differ from each other in at least one of (1) the color component targeted in the setting process, and (2) the direction in which pixels are processed in the setting process. The following shows the specific aspects of each line process.

First type line process (S340): color component=K, processing direction=second direction D2

Second type line process (S320): color component=K, processing direction=third direction D3

Third type line process (S310): color component=KCMY, processing direction=second direction D2

Fourth type line process (S350): color component=KCMY, processing direction=third direction D3

FIG. 8 shows the types of line processes sequentially executed for both the adjusted images Imk and Imc. Each box denotes a single line process. Numbers provided in the left side of each box indicate the order in which the line processes are executed, while numbers in parentheses indicate the types of line processes (first, second, third, and fourth type line processes). Arrows provided in the right side of the box indicate the processing directions. When only one arrow is indicated in a box, only a K pixel line is processed. When the box includes two arrows, both K and C (and also M and Y) pixel lines are processed. In each line process, the setting process is performed one pixel at a time in sequence for each of the pixel lines connected to the line process by dashed lines in FIG. 8. For example, the line process performed the first time is the third type line process in which pixel line 1 for black and pixel line 1 for cyan (and also magenta and yellow) are processed. The line process performed third is a first type line process for processing only pixel line three for black.

The setting unit 240 has four setting process units 244, 245, 246, and 247 (hereinafter simply called "process units 244, 245, 246, and 247) for implementing the four types of line processes described above. Each of the process units 244, 245, 246, and 247 is configured to advance the setting process for two color components in parallel directions. The configuration of each process unit is given below.

First process unit 244: color component=C and M, processing direction=D2

Second process unit 245: color component=Y and K, processing direction=D2

Third process unit 246: color component=C and M, processing direction=D3

Fourth process unit 247: color component=Y and K, processing direction=D3

The process units 244, 245, 246, and 247 execute the following processes.

1) Set the dot formation states for the corresponding color components of the target pixel using the input gradation values Qin (see FIG. 7) for the corresponding color components, an error matrix associated with the corresponding processing direction (the error matrix MX in FIG. 7, for example), and error values stored in the error buffer EB.
2) Store dot data representing the dot formation states set above in a storage device (the volatile storage device 260 of the process circuit 200 or the volatile storage device 120 of the image-processing device 100, for example).
3) Store the target error values Ea in the error buffer EB.

The first process unit 244 and the second process unit 245 handle different color components but share the same processing direction and computational details. Accordingly, the first process unit 244 and the second process unit 245 use a common circuit configuration. Similarly, the third process unit 246 and the fourth process unit 247 share the same processing direction and computational details. Accordingly, the third process unit 246 and the fourth process unit 247 use a common circuit configuration. This arrangement simplifies the construction of the circuit configuration for the setting unit 240.

The following are correlations between the line processes and the process units executing those line processes.

First type line process (S340, K, D2): second process unit 245

Second type line process (S320, K, D3): fourth process unit 247

Third type line process (S310, KCMY, D2): first process unit 244 and second process unit 245

Fourth type line process (S350, KCMY, D3): third process unit 246 and fourth process unit 247

In S310 of FIG. 9, the setting unit 240 executes the third type line process. As described with reference to FIGS. 5 and 8, the target unit area includes two black pixel lines and one pixel line for each of the CMY colors. The input unit 242 selects a first pixel line of the two black pixel lines in the target unit area (a top line of the two black pixel lines) as a target pixel line. The input unit 242 also selects a single pixel line for each of the CMY color components as a target pixel line. Next, the input unit 242 selects a target pixel from each target pixel line. The position of the target pixel with respect to the second direction D2 is identical for each of the CMYK colors. The input unit 242 acquires data from the acquisition unit 230 representing the CMYK gradation values for the target pixels within the target data (i.e., data for the target unit area), supplies data representing gradation values for cyan and magenta to the first process unit 244, and supplies data representing gradation values for yellow and black to the second process unit 245. The first process unit 244 sets the dot formation states for cyan and magenta in the target pixel based on the gradation values received from the input unit 242. Similarly, the second process unit 245 sets the dot formation states for yellow and black in the target pixel based on the gradation values received from the input unit 242. The first process unit 244 and the second process unit 245 store dot data representing the dot formation states in a storage device, such as the volatile storage device 120.

In S310 the input unit 242 repeatedly performs this process of supplying gradation values for target pixels to the first process unit 244 and the second process unit 245 while sequentially shifting the position of the target pixel along the corresponding target pixel line beginning from the pixel on the downstream end in the third direction D3 and progressing one pixel at a time in the second direction D2. In this way, the setting unit 240 sets dot formation states for all color components of all pixels in the target pixel line. In the line process performed at the fifth time shown in FIG. 8, for example, the setting unit 240 sets dot formation states for pixel line 5 in black and for pixel line 3 in each of cyan, magenta, and yellow.

In S320 of FIG. 9, the setting unit 240 executes the second type line process. Here, the input unit 242 selects a second pixel line of the two black pixel lines in the target unit area (a bottom pixel line of the two black pixel lines) as a target pixel line, and does not select any CMY pixel lines as target pixel lines. The input unit 242 repeatedly performs a process to acquire data representing the K gradation value of a target pixel from the acquisition unit 230 and to supply this data to the fourth process unit 247 while moving the position of the target pixel in the target pixel line one pixel at a time in the third direction D3, beginning from the pixel position on the downstream end in the second direction D2. In this way, the setting unit 240 can set the dot formation states of black for all pixels in the target pixel line. By performing the line process performed at the sixth time shown in FIG. 8, for example, the setting unit 240 sets the dot formation states of black for pixels in pixel line 6. Dot data representing the dot formation states set through this process is stored in a storage device, such as the volatile storage device 120.

Through the processes of S310 and S320 described above, the setting unit 240 sets dot formation states for all color components of all pixels in one target unit area (and specifically an odd-numbered unit area).

In S340 of FIG. 9, the setting unit 240 executes the first type line process. The input unit 242 selects a first pixel line of two black pixel lines in the target unit area (a top pixel line of the two black pixel lines) as a target pixel line, and does not select any CMY pixel lines as target pixel lines. The input unit 242 selects a target pixel from the target pixel line. The input unit 242 repeatedly performs a process to acquire data representing the K gradation value of a target pixel from the acquisition unit 230 and to supply this data to the second process unit 245 while moving the position of the target pixel in the target pixel line one pixel at a time in the second direction D2, beginning from the pixel position on the downstream end in the third direction D3. In this way, the setting unit 240 can set the dot formation states of black for all pixels in the target pixel line. By performing the line process performed at the seventh time shown in FIG. 8, for example, the setting unit 240 sets the dot formation states of black for pixels in pixel line 7. Dot data representing the dot formation states set through this process is stored in a storage device, such as the volatile storage device 120.

In S350, the setting unit 240 executes the fourth type line process. The input unit 242 selects a second pixel line of the two black pixel lines in the target unit area (a bottom pixel line of the two black pixel lines) as a target pixel line. The input unit 242 also selects a single pixel line for each of the CMY color components as a target pixel line. The input unit 242 selects a target pixel from each target pixel line. The position of the target pixel with respect to the second direction D2 is identical for each of the CMYK colors. The input unit 242 repeatedly performs a process to acquire data from the acquisition unit 230 representing the CMYK gradation values for the target pixels and to supply the data representing C and M gradation values to the third process unit 246 and supply the data representing Y and K gradation values to the fourth process unit 247 while moving the position of the target pixel in the target pixel line one pixel at a time in the third direction D3, beginning from the pixel position on the downstream end in the second direction D2. In this way, the setting unit 240 sets dot formation states for all color components of all pixels in the target pixel line. In the line process performed at the eighth time shown in FIG. 8, for example, the setting unit 240 sets dot formation states for pixel line 8 in black and for pixel line 4 in each of cyan, magenta, and yellow.

Through the processes of S340 and S350 described above, the setting unit 240 sets dot formation states for all color components of all pixels in one target unit area (and specifically an even-numbered unit area).

The process units 210, 220, 230, 242, 244, 245, 246, and 247 of the process circuit 200 have circuit configurations constructed to implement their corresponding functions described above. Any method known in the art may be applied for constructing circuit configurations based on the above functions.

As described in the above embodiment with reference to FIG. 2, the densities of positions at which the printing unit 190 can form dots differ between K and the CMY colors. Specifically, the ratio of the pixel density for K in the conveying direction Da to the pixel density of C, M, or Y in the conveying direction Da is 2:1. Since the K pixel density is greater than the CMY pixel density, color images can be printed with higher definition in black text. Moreover, in order to perform printing using the printing unit 190 having this configuration, the resolution-adjusted target data has a ratio of 2:1 between the first pixel density of K in the first direction D1 and the second pixel density of CMY in the first direction D1. Therefore, the image-processing device 100 can generate print data suitable for the printing unit 190.

As shown in FIG. 8, the setting unit 240 alternately executes the forward processes and the reverse processes on adjusted data in each of the CMYK colors, while progressing from line to line in the first direction D1. This method suppresses worms and other artifacts.

As shown in FIG. 8, the setting unit 240 executes setting processes for two K pixel lines and one each of the CMY pixel lines in a single unit area by executing two line processes configured of two different types of the first through fourth type line processes. For example, the setting unit 240 sets the dot formation states in an odd-numbered unit area by performing the third type line process and the second type line process. The setting unit 240 sets the dot formation states in an even-numbered unit area by performing the first type line process and the fourth type line process. The setting unit 240 repeatedly executes the third type line process, the second type line process, the first type line process, and the fourth type line process in this order. Through this method, the setting unit 240 can alternately execute the forward processes and the reverse processes for adjusted data in each of the CMYK colors, while progressing from pixel line to pixel line in the first direction D1.

Each of the four types of line processes executes the setting process from pixel to pixel in a single direction. Hence, the setting process for a single line process does not include a mixture of setting processes having different processing directions. As a result, all four types of line processes can be equally implemented. If a process for advancing the setting process in the second direction D2 for pixels in a K pixel line and a process for advancing the setting process in the third direction D3 for pixels in a C pixel line were to be mixed within a single line process, for example, data including the position of a target pixel in the second direction D2, the positions of peripheral pixels to the target pixel, the error matrix MX, and the processing direction of the setting process (hereinafter collectively called the "process data") would differ between K and C. Consequently, it would be necessary to manage process data related to K and process data related to C independently during a line process, leading to a more complex line process. In the embodiment, on the other hand, process data including the position of a target pixel in the second direction D2 is common among each of the CMYK colors, thereby simplifying the line process. Generally, the large number of pixels is processed in the printing process. In order to cope with the process load due to the large number of pixels, the input unit 242 of the setting unit 240 uses the same process data, including the position of the target pixel in the second direction D2, for each of the CMYK colors, for example. This increases the number of pixels processed during a printing process. That is, by simplifying the line processes, the embodiment greatly improves the efficiency of the printing process. For example, the embodiment can reduce the time required for performing the printing process and can reduce the required capacity of the storage device.

Further, the two line processes for an odd-numbered unit area are executed in order of the third type line process (S310) and the second type line process (S320) (hereinafter called a "first pattern"), as illustrated in FIGS. 8 and 9. The two line processes for an even-numbered unit area are executed in order of the first type line process (S340) and the fourth type line process (S350) (hereinafter called a "second pattern"). Accordingly, the second pattern differs from the first pattern. Hence, as described with reference to FIG. 8, the setting unit 240 can alternately execute the forward processes and the reverse processes on adjusted data for all CMYK colors, while progressing from pixel line to pixel line in the first direction D1.

B. Second Embodiment

Figure 10:
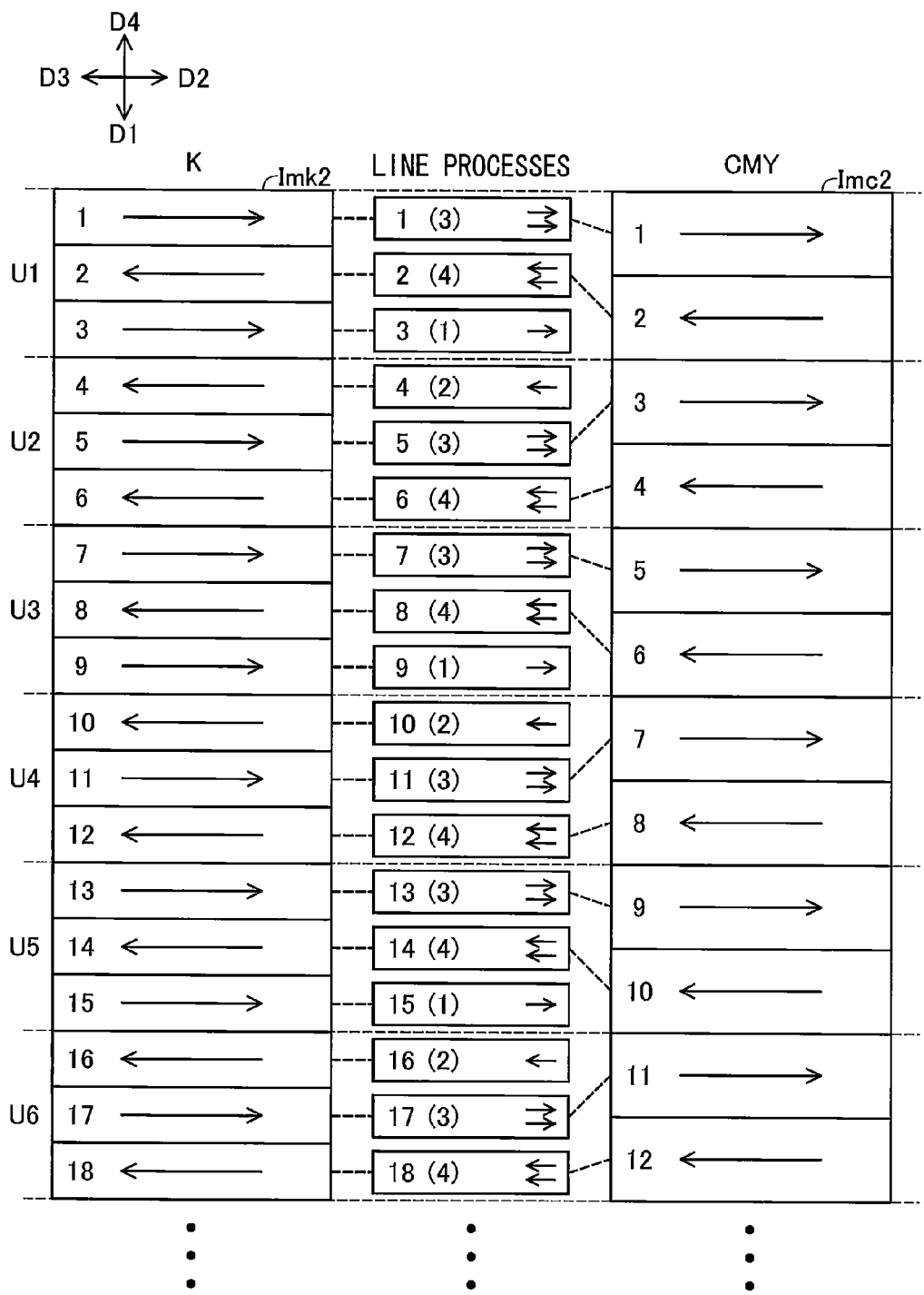
FIG. 10 is an explanatory diagram showing relationships between pixel lines for adjusted images and pixel processing directions for a setting process according to the second embodiment.

FIG. 10 is an explanatory diagram showing the relationships between the processing directions for the setting processes and pixel lines in an adjusted black image Imk2 and an adjusted cyan image Imc2 according to the second embodiment. The adjusted images according to the second embodiment differ from the first embodiment shown in FIG. 8 in that the ratio of pixel densities in the first direction D1 for the adjusted black image Imk2 and the adjusted cyan image Imc2 is 3:2. The reason for this ratio is as follows. While not shown in the drawing, the ratio of a first dot density corresponding to the first pitch in the conveying direction Da of nozzles in the black nozzle group to a second dot density corresponding to the second pith in the conveying direction Da of nozzles in each of the CMY nozzle groups is 3:2. For example, the first dot density for K may be 600 dpi while the second dot density for C, M, and Y is 400 dpi. In order to print using a printing unit having this type of print head, the ratio of a first pixel density in the first direction D1 for K and the second pixel density in the first direction D1 for CMY in the resolution-adjusted target data is the same as the ratio of the first dot density to the second dot density. While not shown in the drawing, the halftone processes for the adjusted magenta image and the adjusted yellow image are identical to the process performed for the adjusted cyan image Imc2.

The structure of the image-processing device used for the printing process in the second embodiment is identical to the structure of the image-processing device 100 described in the first embodiment, except for the layout of nozzles. Further, the process in S240 of FIG. 6 described in the first embodiment is modified to implement the setting processes indicated in FIG. 10. For example, a single pixel region in the adjusted cyan image Imc2 overlaps two pixel regions adjacent in the first direction D1 of the original bitmap image. Accordingly, the gradation value of a pixel in the adjusted cyan image Imc2 is set on the basis of at least one gradation value from the two pixels in the original bitmap image (an average gradation value among the two pixels, for example). Steps in the printing process other than S240 are identical to those in the process of the first embodiment (see FIGS. 4, 6, and 7).

As shown in FIG. 10, the setting unit 240 alternately executes the forward processes and the reverse processes on adjusted data in each of the CMYK colors, while progressing from line to line in the first direction D1. This method suppresses worms and other artifacts.

Further, a single unit area is configured of three black pixel lines and two pixel lines of each of the CMY colors. Three line processes are performed to set dot formation states in a single unit area. The three line processes for an odd-numbered unit area are performed in the order of the third type line process, the fourth type line process, and the first type line process (hereinafter called a "first pattern"). The three line processes for an even-numbered unit area are performed in the order of the second type line process, the third type line process, and the fourth type line process (hereinafter called a "second pattern"). Thus, the second pattern differs from the first pattern. Accordingly, the setting unit 240 can alternately execute forward processes and reverse processes on adjusted data for each of the CMYK colors while advancing from pixel line to pixel line in the first direction D1, as illustrated in FIG. 10. In S240 of FIG. 6, the three line processes for odd-numbered unit areas and the three line processes for even-numbered unit areas are alternated repeatedly.

C. Third Embodiment

Figure 11:
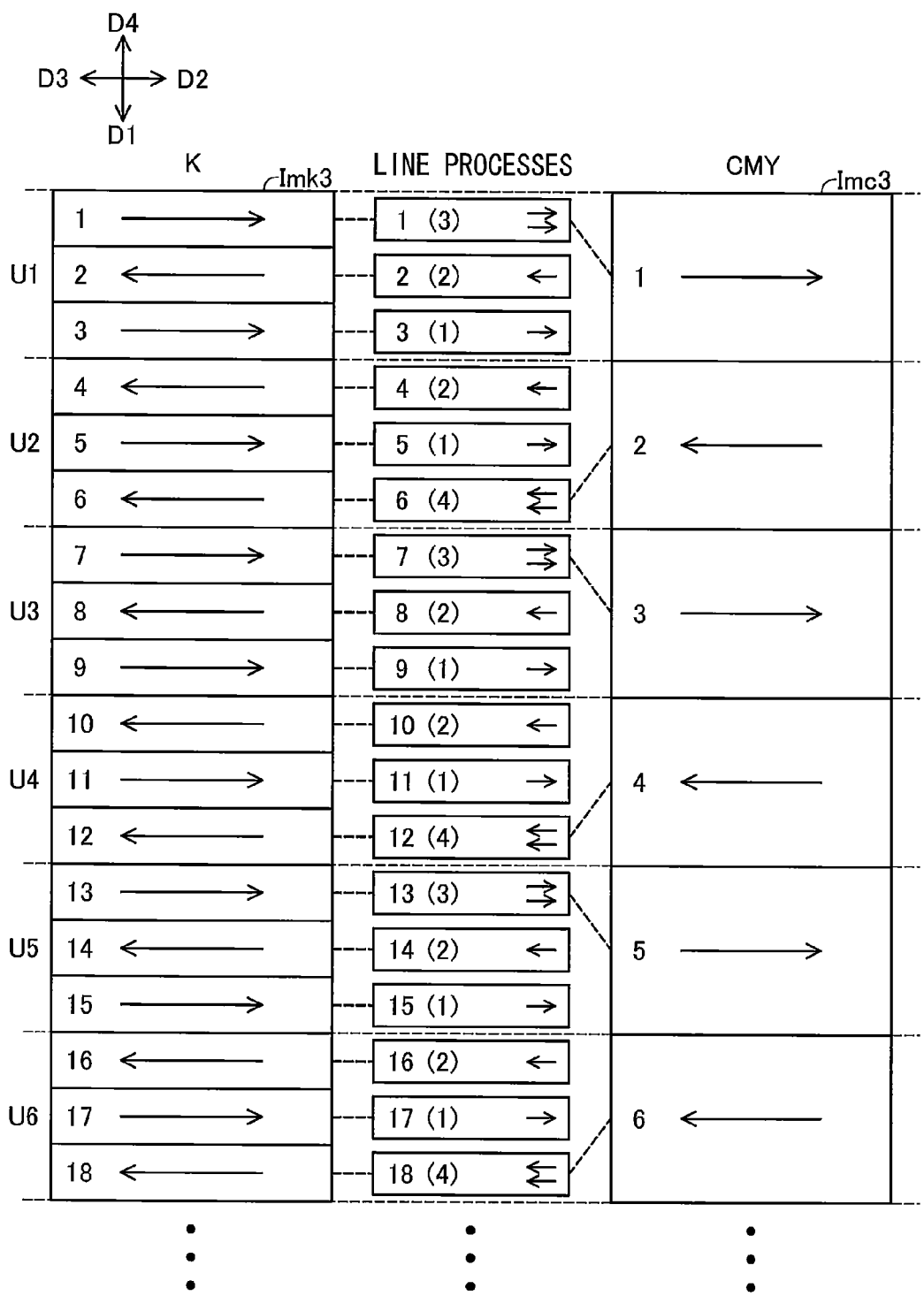
FIG. 11 is an explanatory diagram showing relationships between pixel lines for adjusted images and pixel processing directions for a setting process according to the third embodiment.

FIG. 11 is an explanatory diagram showing the relationships between the processing directions for the setting processes and pixel lines in an adjusted black image Imk3 and an adjusted cyan image Imc3 according to the third embodiment. The adjusted images according to the third embodiment differ from the first embodiment shown in FIG. 8 in that the ratio of pixel densities in the first direction D1 for the adjusted black image Imk3 and the adjusted cyan image Imc3 is 3:1. The reason for this ratio is as follows. While not shown in the drawing, the ratio of a first dot density corresponding to the first pitch in the conveying direction Da of nozzles in the black nozzle group to a second dot density corresponding to the second pith in the conveying direction Da of nozzles in each of the CMY nozzle groups is 3:1. For example, the first dot density for K may be 1200 dpi while the second dot density for C, M, and Y is 400 dpi. In order to print using a printing unit having this type of print head, the ratio of a first pixel density in the first direction D1 for K and the second pixel density in the first direction D1 for CMY in the resolution-adjusted target data is the same as the ratio of the first dot density to the second dot density. While not shown in the drawing, the halftone processes for the adjusted magenta image and the adjusted yellow image are identical to the process performed for the adjusted cyan image Imc3.

The structure of the image-processing device used for the printing process in the third embodiment is identical to the structure of the image-processing device 100 described in the first embodiment, except for the layout of nozzles. Further, the process in S240 of FIG. 6 described in the first embodiment is modified to implement the setting processes indicated in FIG. 11. For example, a single pixel region in the adjusted cyan image Imc3 overlaps three pixel regions sequentially arranged in the first direction D1 of the original bitmap image. Accordingly, the gradation value of a pixel in the adjusted cyan image Imc3 is set on the basis of at least one gradation value from the three pixels in the original bitmap image (an average gradation value among the two or three pixels, for example). Steps in the printing process other than S240 are identical to those in the process of the first embodiment (see FIGS. 4, 6, and 7).

As shown in FIG. 11, the setting unit 240 alternately executes the forward processes and the reverse processes on adjusted data in each of the CMYK colors, while progressing from line to line in the first direction D1. This method suppresses worms and other artifacts.

Further, a single unit area is configured of three black pixel lines and one pixel line of each of the CMY colors. Three line processes are performed to set dot formation states in a single unit area. The three line processes for an odd-numbered unit area are performed in the order of the third type line process, the second type line process, and the first type line process (hereinafter called a "first pattern"). The three line processes for an even-numbered unit area are performed in the order of the second type line process, the first type line process, and the fourth type line process (hereinafter called a "second pattern"). Thus, the second pattern differs from the first pattern. Accordingly, the setting unit 240 can alternately execute forward processes and reverse processes on adjusted data for each of the CMYK colors while advancing from pixel line to pixel line in the first direction D1, as illustrated in FIG. 11. In S240 of FIG. 6, the three line processes for odd-numbered unit areas and the three line processes for even-numbered unit areas are alternated repeatedly.

D. Variations of the Embodiments (1) The combination of color components used in printing may differ from the CMYK in the embodiments (CMY, for example). In the target data whose pixel densities have been adjusted for printing, color components having relatively high pixel densities in the first direction D1 will be called "high-density colors," and color components having relatively low pixel densities in the first direction D1 will be called "low-density colors." Further, pixel lines having high-density colors will be called "high-density pixel lines," and pixel lines having low-density colors will be called "low-density pixel lines." Here, a color component other than black (cyan, for example) may serve as the high-density color. Similarly, color components other than cyan, magenta, and yellow (the two color components magenta and yellow, for example) may serve as the low-density colors.

By employing high-density pixel lines and low-density pixel lines, the four types of line processes described in the embodiments may be restated as follows.

First type line process: a line process implementing a forward process for a high-density pixel line Second type line process: a line process implementing a reverse process for a high-density pixel line Third type line process: a line process including a forward process for a high-density pixel line and a forward process for a low-density pixel line Fourth type line process: a line process including a reverse process for a high-density pixel line and a reverse process for a low-density pixel line Thus, the first type line process and the second type line process implement setting processes only for high-density pixel lines (hereinafter called a "high-density line process"). The third type line process and the fourth type line process implement setting processes both for high-density pixel lines and low-density pixel lines (hereinafter called a "high-/low-density line process").

(2) The ratio of pixel density in the first direction D1 for high-density colors (K, for example) to the pixel density in the first direction D1 for low-density colors (CMY, for example) is not limited to the ratios 2:1 (FIG. 8), 3:2 (FIG. 10), and 3:1 (FIG. 11) in the target data whose pixel data has been adjusted for printing, but in general may be any ratio L:N, where L is an integer of 2 or greater, N is an integer of at least 1 or greater and is smaller than L, and the greatest common divisor for L and N is 1. Normally, the ratio L:N is set the same as the ratio of densities in the conveying direction Da for positions at which the printing unit can form dots (specifically, the ratio of dot density for high-density colors to the dot density for low-density colors). In either case, the dot formation states of all pixels in a single unit area can be set in L line processes.

(3) The total number of the first type line processes and the second type line processes (i.e., the total number of high-density line processes) included in L line processes for a single unit area is preferably (L−N). For example, this total number is 1 (2−1) in the first embodiment of FIG. 8, 1 (3−2) in the second embodiment of FIG. 10, and 2 (3−1) in the third embodiment of FIG. 11. Normally, a single unit area includes L high-density pixel lines and N low-density pixel lines. Setting the total number of high-density line processes performed in the L line processes to (L−N) reduces the possibility of needing more than L line processes for a single unit area (reduces the possibility of needing line processes for processing only low-density pixel lines, for example). In this way, it is possible to implement suitable setting processes for setting dot formation states while preventing these processes from becoming complex.

(4) The setting unit 240 selects one pixel line to be processed (i.e., a target pixel line) for each of the color components, one line at a time in the first direction D1, while executing a line process on the selected target pixel line. Here, it is preferable for the setting unit 240 to cyclically repeat a plurality of line processes configured of the third type line process and the fourth type line process (i.e., the high-/low-density line processes; hereinafter called a "first specific process"). In the example of the first embodiment in FIG. 8, the setting unit 240 repeatedly alternates between the first specific process for executing the fourth and third type line processes in that order, and two other line processes (the second and first type line processes). In the second embodiment of FIG. 10, the setting unit 240 repeatedly alternates between the first specific process for executing the third, fourth, third, and fourth type line processes in that order, and two other line processes (the first and second type line processes). In the third embodiment of FIG. 11, the setting unit 240 repeatedly alternates between the first specific process for executing the fourth and third type line processes in that order, and four other line processes (the second, first, second, and first type line processes). By cyclically repeating the first specific process in this way, the setting unit 240 can better prevent the process for setting dot formation states from becoming complex than when the details of the line processes are irregular.

Here, when the high-density pixel lines sequentially arranged in the first direction D1 and the subject of one first specific process are divided in half in the first direction D1 by the dividing border line, the unit area that includes L high-density pixel lines sequentially arranged in the first direction D1 from the dividing border line is a first type of unit area. In the examples of FIGS. 8, 10, and 11, odd-numbered unit areas correspond to the first type of unit area. The line process performed on the $L^{th}$ high-density pixel line in the first type of unit area (i.e., the high-density pixel line on the downstream edge of the unit area in the first direction D1) is preferably one of the first and second type line processes (i.e., a high-density line process). In the above examples, the second type line process is used in FIG. 8, and the first type line process is used in FIG. 10 and FIG. 11. In this way, a high-/low-density line process is performed on the high-density pixel line positioned on the downstream edge of the first type of unit area in the fourth direction D4, while a high-density line process is performed on the high-density pixel line positioned on the downstream edge of the first type of unit area in the first direction D1. Therefore, the setting unit 240 can alternately execute the forward processes and reverse processes suitably on corresponding high-density colors and low-density colors while progressing pixel line by pixel line in the first direction D1, thereby preventing the process for setting dot formation states from becoming complex.

(5) The N line processes for N high-density pixel lines sequentially arranged in the first direction D1 from the border of the downstream side of the first type of unit area described above relative to the fourth direction D4 are preferably configured of at least one of the third and fourth type line processes (i.e., a high-/low-density line process). For example, the third type line process is performed for the N line processes in the example of FIG. 8 (N=1), the third and fourth type line processes in the example of FIG. 10 (N=2), and the third type line process in the example of FIG. 11 (N=1). Through this process, the setting unit 240 can suitably execute setting processes for N low-density pixel lines included in the first type of pixel area. Therefore, the setting unit 240 can alternately execute the forward processes and reverse processes suitably on corresponding high-density colors and low-density colors while progressing pixel line by pixel line in the first direction D1, thereby preventing the process for setting dot formation states from becoming complex.

(6) It is preferable that the setting unit 240 alternately executes the first specific process described above and a second specific process including a plurality of high-density line processes. In the example of FIG. 8, the second specific process includes the second and first type line processes executed in that order. In the example of FIG. 10, the second specific process includes the first and second type line processes executed in that order. In the example of FIG. 11, the second specific process includes the second, first, second, and first type line processes executed in that order. By alternately repeating the first specific process and the second specific process in this way, the setting unit 240 can better prevent the process for setting dot formation states from becoming complex than when the details of the line processes are irregular.

(7) The unit area processed next to the first type of unit area will be called a "second type of unit area." In the examples of FIGS. 8, 10, and 11, the second type of unit area is an even-numbered unit area. When the first specific process and the second specific process are alternately repeated, the line process performed on the first high-density pixel line of the L high-density pixel lines in the second type of unit area juxtaposed in the first direction D1 (i.e., the high-density pixel line on the downstream edge of the second type of unit area in the fourth direction D4) is preferably one of the first and second type line processes (i.e., a high-density line process). The first type line process is used on the first high-density pixel line in the example of FIG. 8, and the second type line process is used in the examples of FIGS. 10 and 11. By repeatedly alternating the first specific process and the second specific process in this way, setting processes can be suitably implemented on both the first type of unit area and second type of unit area. Specifically, the setting unit 240 can alternately execute the forward processes and reverse processes suitably on corresponding high-density colors and low-density colors while progressing pixel line by pixel line in the first direction D1, thereby preventing the process for setting dot formation states from becoming complex.

Here, the N line processes for N high-density pixel lines among the L high-density pixel lines in the second type of unit area juxtaposed in the first direction D1 from the $(L-N+1)^{th}$ line to the $L^{th}$ line are preferably configured of at least one of the third and fourth type line processes (i.e., a high-/low-density line process). For example, the fourth type line process is used for these N line processes in the example of FIG. 8 (N=1), the third and fourth type line processes in the example of FIG. 10 (N=2), and the fourth type line process in the example of FIG. 11 (N=1). Setting processes can be suitably implemented on the line processes for both L high-density pixel lines and N low-density pixel lines included in the second type of unit area. Therefore, the setting unit 240 can alternately execute the forward processes and reverse processes suitably on corresponding high-density colors and low-density colors while progressing pixel line by pixel line in the first direction D1, thereby preventing the process for setting dot formation states from becoming complex.

(8) Various other correlations between pixel lines and line processes may be employed in place of the correlations described above (the correlations in FIGS. 8, 10, and 11, for example). For example, the first type line process and the second type line process may be replaced with each other, and the third type line process and the fourth type line process may be replaced with each other. In this case, the setting unit 240 can suitably execute the forward processes and reverse processes alternately on high-density colors and low-density colors, respectively while progressing pixel line by pixel line in the first direction D1.

In general, it is preferable that the setting unit 240 alternates repeatedly the following two processes.

A) (2×(L−N)) line processes in which (L−N) first type line processes and (L−N) second type line processes are alternated repeatedly B) (2×N) line processes in which N third type line processes and N fourth type line processes are alternated repeatedly Accordingly, the setting unit 240 can suitably execute the forward processes and the reverse processes alternately on high-density colors and low-density colors, respectively while progressing pixel line by pixel line in the first direction D1.

(9) The structure of the setting unit 240 shown in FIG. 3 may be replaced with any of various structures. For example, the setting unit may be provided with two setting process units: one setting process unit that executes forward processes for all color components in parallel, and one setting process unit that executes reverse processes for all color components in parallel. Alternatively, the setting unit may be provided with a different setting process unit for each color component. For example, the setting unit may be provided with four setting process units for executing forward processes for the corresponding four CMYK color components, and four setting process units for executing reverse processes for the corresponding four CMYK color components.

(10) Various other procedures may be employed in the printing process in place of the procedures shown in FIGS. 4, 6, and 9. For example, the series of processes from S210 to S280 of FIG. 6 may be repeated for each pixel rather than for each unit area. Alternatively, rather than repeating the series of processes from S210 to S280, the series of processes from S100 to S120 in FIG. 4 may be repeated for each unit area or for each pixel. Further, when L line processes for a single unit area include a plurality of high-density line processes, high-/low-density line processes may be inserted between some of the plurality of high-density line processes and the remainder of the high-density line processes. Similarly, when L line processes for a single unit area include a plurality of high-/low-density line processes, high-density line processes may be inserted between some of the plurality of high-/low-density line processes and the remainder of the high-/low-density line processes. In either case, the setting unit 240 can alternately execute the forward processes and reverse processes suitably on corresponding high-density colors and low-density colors while progressing pixel line by pixel line in the first direction D1, thereby suppressing worms and other artifacts.

(11) Various other structures may be employed for a device that executes an image process for printing in place of the structure shown in FIGS. 1 and 3. For example, the printing unit 190 may be a separate device and connected to the image-processing device 100. Further, any part or all of the process circuit 200 may be omitted, and the processor 110 may implement the functions of the omitted parts according to a program. Conversely, a dedicated hardware circuit, such as an ASIC, may execute any part or all of the image data processes for printing (for example, all of the steps S100, S110, and S120 in FIG. 4 and S200 through S260 and S280 in FIG. 6). The acquisition unit 230 may also acquire target data from a device other than the image-processing device 100 (a server connected to the image-processing device 100 via a network, for example). In this case, the device other than the image-processing device 100 (a device that supplies the target data, for example) may execute part of the printing process (steps S110 in FIG. 4 and S220 and S230 in FIG. 6, for example). In either of these cases, the device that acquires the target data, executes the setting processes, and executes the process for supplying data representing dot formation states to the printing unit (the process circuit 200 in the example of FIG. 1) corresponds to the control device that controls the image data process.

(12) The image-processing device 100 of the present disclosure may be a different type of device from a multi-function peripheral, such as a personal computer, digital camera, scanner, or smartphone. Further, a plurality of devices that can communicate over a network (computers, for example) may each implement some of the functions of the image data processes so that the devices as a whole can provide the functions required for implementing the process. (Here, the system including the devices corresponds to the image-processing device.)

When all or part of the functions of the present disclosure are implemented with computer programs, the programs can be stored on a computer-readable storage medium (a non-temporary storage medium, for example). The programs may be used on the same storage medium on which they are supplied, or may be transferred to a different storage medium (computer-readable storage medium). The "computer-readable storage medium" may be a portable storage medium, such as a memory card or a CD-ROM; an internal storage device built into the computer, such as any of various ROM or the like; or an external storage device, such as a hard disk drive, connected to the computer.

While the disclosure has been described in detail with reference to the above embodiments thereof, it would be apparent to those skilled in the art that various changes and modifications may be made therein.

What is claimed is:

1. An image-processing device comprising a controller configured to perform:
    acquiring target image data representing an image having a plurality of pixel lines arranged in a first direction, each of the plurality of pixel lines extending in a second direction orthogonal to the first direction and including a plurality of pixels, the target image data including:
      first image data representing a first image of a first color and having gradation values of the first color; and
      second image data representing a second image of a second color and having gradation values of the second color, the first image data including a first pixel density in the first direction, the second image data including a second pixel density in the first direction, the second pixel density being smaller than the first pixel density;
    determining a dot formation state of a target pixel among the plurality of pixels and an error value of the target pixel by using a gradation value of the target pixel and an error value of at least one peripheral pixel of the target pixel, a determination by the determining being performed alternately with a forward process and a reverse process on pixel line to pixel line basis while sequentially selecting each of the plurality of pixel lines in an order progressing in the first direction, wherein in the forward process, the controller sequentially selects each pixel as the target pixel in one selected pixel line in an order progressing in the second direction, and determines the dot formation state of the selected pixel whereas, in the reverse process, the controller sequentially selects each pixel as the target pixel in one selected pixel line in an order progressing in a third direction opposite to the second direction, and determines the dot formation state of the selected pixel;
    generating data representing: a dot formation state of a pixel in the first image data including the first pixel density; and a dot formation state of a pixel in the second image data including the second pixel density smaller than the first pixel density; and
    supplying the data representing the dot formation state to a printing unit,
    wherein a ratio of the first pixel density to the second pixel density is L:N, L being an integer larger than 2, N being an integer larger than 1 and smaller than L, a greatest common divisor for L and N being 1;
    wherein the image includes a plurality of unit areas, wherein the first image includes a plurality of first-type pixel lines extending in the second direction as a part of the plurality of pixel lines, wherein the second image includes a plurality of second-type pixel lines extending in the second direction as another part of the plurality of pixel lines, each of the plurality of unit areas including L-number of the first-type pixel lines arranged sequentially in the first direction and N-number of the second-type pixel lines arranged sequentially in the first direction, the plurality of unit areas including a first unit area and a second unit area, determination of dot formation states for pixels in the second unit area being performed next to determination of dot formation states for pixels in the first unit area;
    wherein the determination performed by the controller includes line processes for L times to determine dot formation states of pixels in the L-number of the first-type pixel lines in one unit area and the N-number of the second-type pixel lines in the one unit area, each of the line processes performed L times being one of at least two of a first type line process, a second type line process, a third type line process, and a fourth type line process;
    wherein in the first type line process, dot formation states of pixels in the second-type pixel line are not determined, and dot formation states of pixels in the first-type pixel line are determined according to the forward process;
    wherein in the second type line process, dot formation states of pixels in the second-type pixel line are not determined, and dot formation states of pixels in the first-type pixel line are determined according to the reverse process;
    wherein in the third type line process, dot formation states of pixels in the first-type pixel line and dot formation states of pixels in the second-type pixel line are determined according to the forward process;
    wherein in the fourth type line process, dot formation states of pixels in the first-type pixel line and dot formation state of pixels in the second-type pixel line are determined according to the reverse process;
    wherein line processes are performed L times for the first unit area in a first pattern defined by a combination and an order of the first type line process, the second type line process, the third type line process, and the fourth type line process;
    wherein line processes are performed L times for the second unit area in a second pattern defined by a combination and an order of the first type line process, the second type line process, the third type line process, and the fourth type line process;
    wherein the first pattern differs from the second pattern.

2. The image-processing device according to claim 1, a sum of number of the first type line processes included in the L-number of the line processes for one unit area and number of the second type line processes included in the L-number of the line processes for the one unit area is L−N.

3. The image-processing device according to claim 1, wherein the determination performed by the controller includes periodically performing a first specific process including a plurality of line processes, each of the plurality of line processes in the first specific process being one of the third type line process and the fourth type line process,
  wherein the first unit area is defined so that when first-type pixel lines, of the plurality of first-type pixel lines, subjected to one performance of the first specific process is equally divided in half by a border line extending in the second direction, the first unit area includes L-number of the first-type pixel lines sequentially arranged in the first direction from the border line,
  wherein L-th first-type pixel line arranged in the first unit area from the border line in the first direction is performed by one of the first type line process and the second type line process.

4. The image-processing device according to claim 3, wherein at least one of the third type line process and the fourth type line process is performed on N-number of the first-type pixel lines sequentially arranged in the first direction from the border line in the first unit area.

5. The image-processing device according to claim 1, wherein the determining alternately performs a first specific process and a second specific process, the first specific process including a plurality of line processes, each of the plurality of line processes in the first specific process being one of the third type line process and the fourth type line process, the second specific process including a plurality of line processes, each of the plurality of line processes in the second specific process being one of the first type line process and the second type line process,
  wherein the first unit area is defined so that when first-type pixel lines, of the plurality of first-type pixel lines, subjected to one performance of the specific process is equally divided in half by a border line extending in the second direction, the first unit area includes L-number of the first-type pixel lines sequentially arranged in the first direction from the border line,
  wherein a first first-type pixel line, of the plurality of first-type pixel lines, arranged at an upstream end of the second unit area in the first direction is performed by one of the first type line process and the second type line process.

6. The image-processing device according to claim 5, wherein N-number of first-type pixel lines from an (N−L+1)-th first-type pixel line to N-th first type pixel line, of the plurality of first-type pixel lines, arranged in the first direction from an upstream end of the second unit area in the first direction are performed by at least one of the third type line process and the fourth type line process.

7. The image-processing device according to claim 1, wherein L is 2 and N is 1,
  wherein the first unit area includes a first first-type pixel line and a second first-type pixel line, of the plurality of first-type pixel lines, wherein, in the first unit area, the first first-type pixel line is positioned at upstream end in the first direction and the second first-type pixel line is positioned next to the first first-type pixel line in the first direction,
  wherein, in the first unit area, the first first-type pixel line is performed by one of the third-type line process and the fourth-type line process,
  wherein, in the first unit area, the second first-type pixel line is performed by one of the first-type line process and the second-type line process,
  wherein the second unit area includes another first first-type pixel line and another second first-type pixel line, wherein, in the second unit area, the another first first-type pixel line is positioned at an upstream end of the second unit area in the first direction and the another second first-type pixel line is positioned next to the another first first-type pixel line in the first direction,
  wherein, in the second unit area, the another first first-type pixel line is performed by one of the first-type line process and the second-type line process,
  wherein, in the second unit area, the another second first-type pixel line is performed by one of the third-type line process and the fourth-type line process.

8. A non-transitory computer readable storage medium storing a set of program instructions installed on and executed by a computer, the program instructions comprising:
  acquiring target image data representing an image having a plurality of pixel lines arranged in a first direction, each of the plurality of pixel lines extending in a second direction orthogonal to the first direction and including a plurality of pixels, the target image data including: first image data representing a first image of a first color and having gradation values of the first color; and second image data representing a second image of a second color and having gradation values of the second color, the first image data including a first pixel density in the first direction, the second image data including a second pixel density in the first direction, the second pixel density being smaller than the first pixel density;
  determining a dot formation state of a target pixel among the plurality of pixels and an error value of the target pixel by using a gradation value of the target pixel and an error value of at least one peripheral pixel of the target pixel, a determination by the determining being performed alternately with a forward process and a reverse process on pixel line to pixel line basis while sequentially selecting each of the plurality of pixel lines in an order progressing in the first direction, wherein in the forward process, the controller sequentially selects each pixel as the target pixel in one selected pixel line in an order progressing in the second direction, and determines the dot formation state of the selected pixel whereas, in the reverse process, the controller sequentially selects each pixel as the target pixel in one selected pixel line in an order progressing in a third direction opposite to the second direction, and determines the dot formation state of the selected pixel;
  generating data representing: a dot formation state of a pixel in the first image data including the first pixel density; and a dot formation state of a pixel in the second image data including the second pixel density smaller than the first pixel density; and
  supplying the data representing the dot formation state to a printing unit,
  wherein a ratio of the first pixel density to the second pixel density is L:N, L being an integer larger than 2, N being an integer larger than 1 and smaller than L, a greatest common divisor for L and N being 1;
  wherein the image includes a plurality of unit areas, wherein the first image includes a plurality of first-type pixel lines extending in the second direction as a part of the plurality of pixel lines, wherein the second image includes a plurality of second-type pixel lines extending in the second direction as another part of the plurality of pixel lines, each of the plurality of unit areas including L-number of the first-type pixel lines arranged sequentially in the first direction and N-number of the second-type pixel lines arranged sequentially in the first direction, the plurality of unit areas including a first unit area and a second unit area, determination of dot formation states for pixels in the second unit area being performed next to determination of dot formation states for pixels in the first unit area;

wherein the determination performed by the controller includes line processes for L times to determine dot formation states of pixels in the L-number of the first-type pixel lines in one unit area and the N-number of the second-type pixel lines in the one unit area, each of the line processes performed L times being one of at least two of a first type line process, a second type line process, a third type line process, and a fourth type line process;

wherein in the first type line process, dot formation states of pixels in the second-type pixel line are not determined, and dot formation states of pixels in the first-type pixel line are determined according to the forward process;

wherein in the second type line process, dot formation states of pixels in the second-type pixel line are not determined, and dot formation states of pixels in the first-type pixel line are determined according to the reverse process;

wherein in the third type line process, dot formation states of pixels in the first-type pixel line and dot formation states of pixels in the second-type pixel line are determined according to the forward process;

wherein in the fourth type line process, dot formation states of pixels in the first-type pixel line and dot formation state of pixels in the second-type pixel line are determined according to the reverse process;

wherein line processes are performed L times for the first unit area in a first pattern defined by a combination and an order of the first type line process, the second type line process, the third type line process, and the fourth type line process;

wherein line processes are performed L times for the second unit area in a second pattern defined by a combination and an order of the first type line process, the second type line process, the third type line process, and the fourth type line process;

wherein the first pattern differs from the second pattern.

\* \* \* \* \*

UNITED STATES PATENT AND TRADEMARK OFFICE
CERTIFICATE OF CORRECTION

PATENT NO.        : 9,594,989 B2
APPLICATION NO.   : 14/806890
DATED             : March 14, 2017
INVENTOR(S)       : Yasunari Yoshida It is certified that error appears in the above-identified patent and that said Letters Patent is hereby corrected as shown below:

In the Claims

Claim 5
Column 25, Line 31, insert -- first -- before -- specific --.

Signed and Sealed this
Sixteenth Day of January, 2018

Joseph Matal
*Performing the Functions and Duties of the
Under Secretary of Commerce for Intellectual Property and
Director of the United States Patent and Trademark Office*